United States Patent [19]
Ho et al.

[11] Patent Number: 5,291,431
[45] Date of Patent: Mar. 1, 1994

[54] ARRAY MULTIPLIER ADAPTED FOR TILED LAYOUT BY SILICON COMPILER

[75] Inventors: Chung-Yih Ho; Chi-Yuan Chin; Richard I. Hartley, all of Schenectady; Michael J. Hartman, Clifton Park; Kenneth B. Welles, II, Scotia, all of N.Y.

[73] Assignee: General Electric Company, Schenectady, N.Y.

[21] Appl. No.: 965,141

[22] Filed: Oct. 22, 1992

Related U.S. Application Data

[63] Continuation-in-part of Ser. No. 709,562, Jun. 3, 1991, abandoned.

[51] Int. Cl.⁵ .............................................. G06F 7/52
[52] U.S. Cl. ............................................. 364/760
[58] Field of Search ................................. 364/760

[56] References Cited

U.S. PATENT DOCUMENTS

| | | | |
|---|---|---|---|
| 4,646,257 | 2/1987 | Essig et al. ............. | 364/760 |
| 4,748,584 | 5/1988 | Noda ....................... | 364/760 |
| 4,752,905 | 6/1988 | Nakagawa et al. ..... | 364/760 |
| 4,791,601 | 12/1988 | Tanaka .................. | 364/760 |
| 4,862,405 | 8/1989 | Benschneider et al. | 364/760 |
| 5,111,421 | 5/1992 | Molnar et al. ......... | 364/748 |

OTHER PUBLICATIONS

"A Rapid-Prototyping Environment for Digital-Signal Processors," IEEE Design & Test of Computers, Jun., 1991, pp. 11-26.

Contract No. 85F097700 Statement of Work, Jun. 8, 1988, 8 pages.

"10 MHz Compiled ASIC's for Real Time Graphic Processing," 1988 IEEE Solid State Circuit Conference, Chin et al, 7 pages.

Contract No. N00039-87-C-0182 Statement of Work, High Speed CMOS Microprocessor, 16 pages.

*Primary Examiner*—David H. Malzahn
*Attorney, Agent, or Firm*—Marvin Snyder

[57] ABSTRACT

An array multiplier using modified Booth encoding of multiplier input signals is formed on the surface of a monolithic integrated circuit using masks generated by a computer, in accordance with a silicon compiler program, by arranging an array of standard cells selected from a library of standard cell designs in a tessellation procedure. The array multiplier is laid out in accordance with one of particular tessellation patterns, which employ simpler and more regular patterns of interconnections between cells. Carry-save addition is used in combining partial product terms to avoid concatenating long ripple carry times.

20 Claims, 10 Drawing Sheets

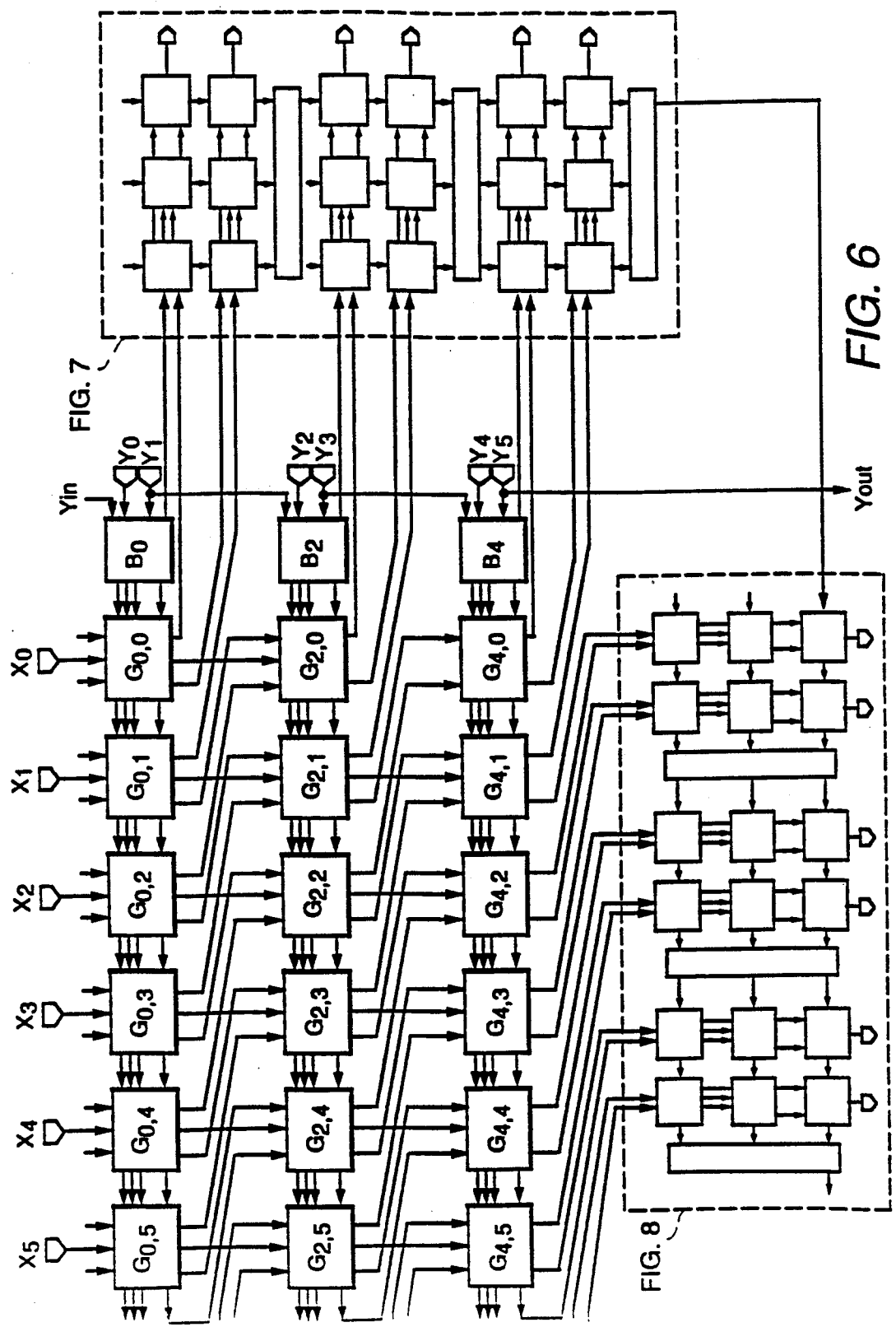

ARRAY MULTIPLIER ADAPTED FOR TILED LAYOUT BY SILICON COMPILER

RELATED APPLICATIONS

This application is a continuation-in-part of application Ser. No. 07/709,562 filed Jun. 6, 1991, now abandoned.

FIELD OF THE INVENTION

The invention relates to digital multipliers and, more paticularly, to digital multipliers using modified Booth encoding and having been constructed within the confines of monolithic integrated circuits in accordance with designs generated by silicon compilers.

BACKGROUND OF THE INVENTION

A digital multiplier embodying the invention is essentially a Booth multiplier. To understand the invention, it is necessary to have some understanding of the mode of operation of a Booth multiplier. Booth multiplication is discussed in the book Computer Arithmetic by Kai Hwang (Wiley, 1979). The method described in the detailed description is the so-called modified Booth encoding, but it will be called Booth encoding for brevity.

A primary goal of the invention is to have standardized layout procedures for integrated-circuit digital multipliers that accommodate their design by silicon compiler methods. It is desirable for "custom" integrated circuit design purposes to have an array multiplier in which a close-packed array by row and by column of multiplier cells can be extended in both the row and column dimensions to accommodate multiplier and multiplicand signals having words of any specified bit-width. Further aspects of the invention extend to "semi-custom" design procedures in which standardized "chunks" or close-packed arrays of multiplier cells by row and by column are disposed on a monolithic integrated circuit and are interconnected by discretionary top-level metallization to form digital multipliers with multiplier and multiplicand signals having respective words of differing specified bit-widths. A basic problem encountered in the design of multipliers that can accomodate multiplier and multiplicand signals of differing specified bit-widths is how best to combine partial product terms, in order to avoid concatenating long ripple carry times, which would slow the generation of digital products. The use of Booth encoding is known to be helpful in this regard since it halves the number of partial products that have to be combined.

Where the bit-width of the multiplier words is always the same, a procedure that has been generally used in the prior art to reduce the time required for combining partial products is to sum the partial products with a tree of adders rather than a chain of adders. This speed-up procedure is not used in digital multipliers constructed in accordance with the invention, because the tree connection of adders is not susceptible readily (if at all) to the regular tessellation and interconnection procedures preferred by the silicon compiler.

SUMMARY OF THE INVENTION

A Booth multiplier constructed within a monolithic integrated circuit in accordance with the invention is made up of: a column of Booth encoder cells, a plurality of decoder/adder cells arranged in M rows and N columns to form a close-packed array, and an additional column of 2M adder cells and an additional row of N adder cells together forming the final adder. The decoder/adder cells use carry-save addition to combine partial product terms, in order to avoid concatenating long ripple carry times for the complete addition of each successive partial product. Each decoder/adder cell may be considered as a gestalt by the silicon compiler or, alternatively, may be constructed by the silicon compiler from smaller cells such as individual decoder and adder cells. In embodiments of the invention favored for multiplying multiplicands having a large number of bits by multipliers that have a large number of bits, the adder cells in the final adder are configured to perform carry-select addition.

BRIEF DESCRIPTION OF THE DRAWING

FIG. 6 is a schematic diagram of a 6×6 array multiplier, which array multiplier except for using a carry-select final adder rather than a ripple-carry final adder is of the same general type as the FIG. 1 array multiplier.

DETAILED DESCRIPTION OF THE INVENTION

Figure 1:
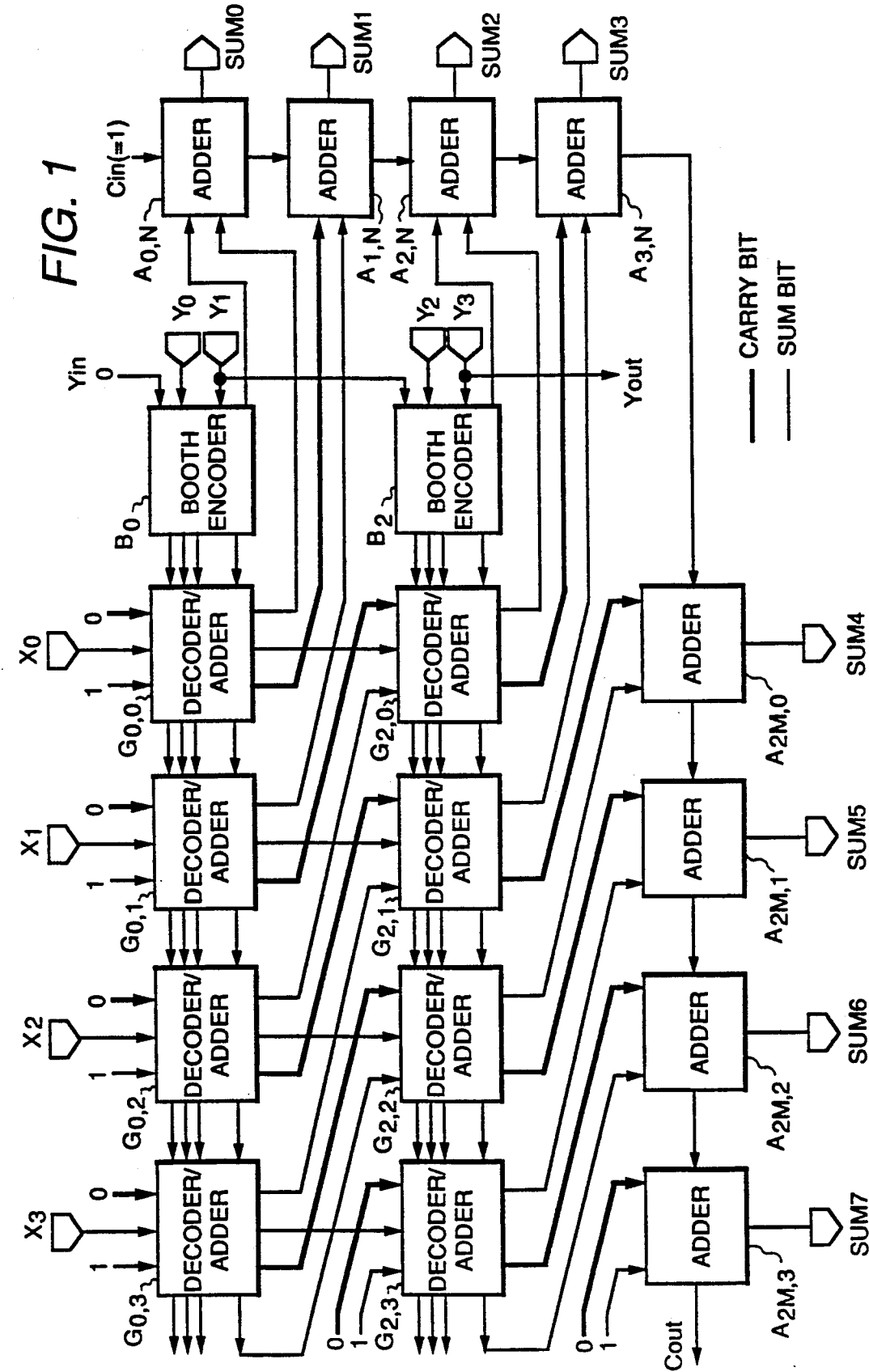
FIG. 1 is a schematic diagram of an array multiplier using modified Booth encoding, which array multiplier is constructed in accordance with the invention from a tessellation of standard cells including modified Booth encoding cells, decoder/adder gestalt cells and final adder cells.

FIG. 1 shows the layout for a Booth multiplier construction within a monolithic integrated circuit in accordance with the invention. The FIG. 1 Booth multiplier is made up of: a column M in number of Booth encoder cells $B_0, B_2, \ldots B_{2(M-1)}$, a plurality $M \times N$ in number of decoder/adder gestalt cells arrayed by row and by column, and a row and a column of adder cells together forming the final adder. The decoder/adder gestalt cells are identified by call-outs of the form $G_{2m,n}$, where $2m$ is the number of the row in which the decoder/adder gestalt cell is located and where n is the number of the column in which the decoder/adder gestalt cell is located. Row numbering is by consecutive even ordinal numbers zeroeth through $2(M-1)^{th}$, and column numbering is by consecutive ordinal numbers zeroeth through $(N-1)^{th}$. In the final adder, the column of adder cells used to generate the minor product have call-outs of the form $A_{m,N}$ with m ranging from zero to 2M−1; and the row of adder cells used to generate the major product have call-outs of the form $A_{2m,n}$ with n ranging from zero to N−1.

FIG. 1 shows the array composed of the Booth encoder cells $B_{2m}$, the decoder/adder gestalt cells $G_{2m,n}$, the column of adder cells $A_{m,N}$ and the row of adder cells $A_{2m,n}$ in somewhat exploded form with electrical connections from certain ones of the cells to certain others of the cells spanning gaps between the cells. This is done to facilitate comprehension of the interconnection relationships between the cells by one viewing the drawing and to leave room for the call-outs identifying the cells. Preferably, however, in actual array multipliers laid out on the surface of a monolithic integrated-circuit die, the cells are in close-packed array without gaps between adjoining cells. Segments of the electrical connections between cells are included within the cells themselves, so the electrical connections are completed as a part of the tiling or tesselation procedure carried forward by the silicon compiler, avoiding or substantially reducing the need for recourse to a subsequent routing procedure to establish point-to-point electrical connections.

Figure 2:
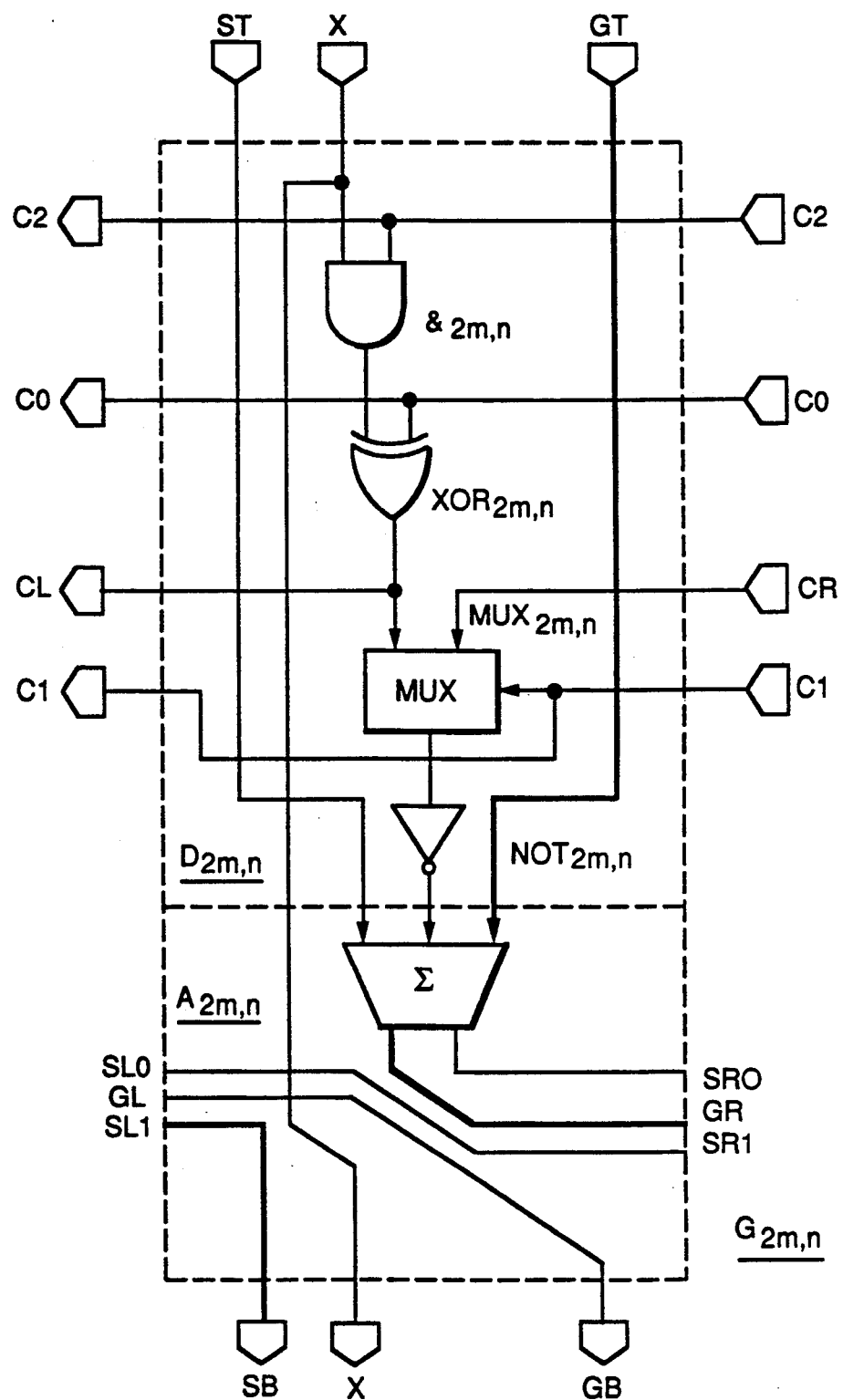
FIG. 2 is a schematic diagram of circuitry included in a decoder/adder gestalt cell used in the FIG. 1 array multiplier for decoding, in accordance with a bit of a multiplicand signal Y, the modified Booth encoding of a multiplier signal X.

FIG. 2 shows more particularly the form the decoder/adder gestalt cell takes. Each decoder/adder gestalt cell $G_{2m,n}$ comprises a respective decoder cell $D_{2m,n}$ and a respective adder cell $A_{2m,n}$. Since the adder cells load their decoder cells identically, the drive power design for the decoder cells can be optimized. The decoder cell $D_{2m,n}$ comprises a respective two-input AND gate $\&_{2m,n}$, a respective two-input exclusive-OR gate $XOR_{2m,n}$, a respective two-input multiplexer $MUX_{2m,n}$, and a respective logic inverter $NOT_{2m,n}$. The SR0 output port of the decoder/adder gestalt cell $G_{2m,n}$ provides a sum bit output signal; the GR output port of the decoder/adder gestalt cell $G_{2m,n}$ provides a first-carry bit output signal with weight twice that of the sum bit output signal; and the CL output port of the decoder/adder gestalt cell $G_{2m,n}$ provides a second-carry bit output signal.

The cell designs for the silicon compiler library of basic cells preferably include to-edge wiring that obviates most of the need for separate wire-routing routines. As shown in FIG. 2, the decoder/adder gestalt cell includes segments of the electrical busses used to correctly apply the sum bit and first-carry bit output signals of the decoder/adder gestalt cells to its left, in accordance with the descriptions provided in the following two paragraphs.

The SR0 sum bit output signal of a decoder/adder gestalt cell $G_{2m,n}$ is the SL0 input signal of any decoder/adder gestalt cell $G_{2m,(n-1)}$ to its immediate right and thence its SR1 output signal. The SR1 output signal of any decoder/adder gestalt cell $G_{2m,(n-1)}$ is the SL1 input signal of any decoder/adder gestalt cell $G_{2m,(n-2)}$ to its immediate right and thence its SB output signal. Thus, the SR0 sum bit output signal of a decoder/adder gestalt cell $G_{2m,n}$ is furnished as a ST input signal to any decoder/adder gestalt cell $G_{2(m+1),(n-2)}$ located in a row next down, two columns to the right. Or, where $2(m+1)=2M$, the SR0 sum bit output signal of a decoder/adder gestalt cell $G_{2m,n}$ is furnished as a ST input signal to an adder $A_{2m,(n-2)}$.

The GR first-carry bit output signal of the decoder/adder gestalt cell $G_{2m,n}$ is the GL input signal of any decoder/adder gestalt cell $G_{2m,(n-1)}$ to its immediate right and thence its GB output signal. Thus, the GR first-carry bit output signal of a decoder/adder gestalt cell $G_{2m,n}$ is furnished as a GT input signal to any decoder/adder gestalt cell $G_{2(m+1),(n-1)}$ located in a row next down, one column to the right. Or, where $2(m+1)=2M$, the GR first-carry bit output signal of the decoder/adder gestalt cell $G_{2m,n}$ is furnished as a GT input signal to an adder $A_{2m,(n-1)}$.

In Booth encoding, a binary twos' complement number is recoded in a redundant radix-four data format, in which numbers are represented using digit values −2, −1, 0, 1 or 2. Thus, in encoded form, a number $<A_n A_{(n-1)} \ldots A_0>$, where each $A_i$ is one of the digits above, represents the numerical value $$\sum_{i=0}^{n} A_i 4^i.$$

The determination of the digit $A_i$ is done by examining the bits $Y_{2j-1}$, $Y_{2j}$ and $Y_{2j+1}$ of the uncoded twos' complement value. Thus, the input value Y is divided into overlapping sections of three bits. For the determination of the coded value $Y_0$, a dummy value of ZERO for the non-existent bit $Y_{-1}$ is assumed. However, a dummy value of ONE for the nonexistent bit $Y_{-1}$ can instead be used, where it is desired to calculate $X(Y+1)$ instead of $X*Y$. The encoded digit values are represented by three bit values, C0, C1 and C2 representing the allowable digit values −2, −1, 0, 1, 2. Each encoder cell takes three bits $Y_{2j-1}$, $Y_{2j}$ and $Y_{2j+1}$ of the multiplier input, Y, and encodes them in three bits C0, C1 and C2. There is some flexibility in the representation of the digit value by the three code bits C0, C1 and C2; it need not be a twos' complement representation.

The following table shows a Booth encoding of three bits of input.

| $Y_{2j+1}$ | $Y_{2j}$ | $Y_{2j-1}$ | $A_i$ | C0 | C1 | C2 |
|---|---|---|---|---|---|---|
| 0 | 0 | 0 | 0 | X | X | 0 |
| 0 | 0 | 1 | 1 | 1 | 0 | 1 |
| 0 | 1 | 0 | 1 | 1 | 0 | 1 |
| 0 | 1 | 1 | 2 | 1 | 1 | 1 |
| 1 | 0 | 0 | −2 | 0 | 1 | 1 |
| 1 | 0 | 1 | −1 | 0 | 0 | 1 |
| 1 | 1 | 0 | −1 | 0 | 0 | 1 |
| 1 | 1 | 1 | 0 | X | X | 0 |

The meanings of the three Booth-code bits, C0, C1 and C2 are as follows:
 C2 if 0 set to 0
 C1 if 1 multiply by 2 (shift left)
 C0 if 0 multiply by −1 (invert)

Figure 3:
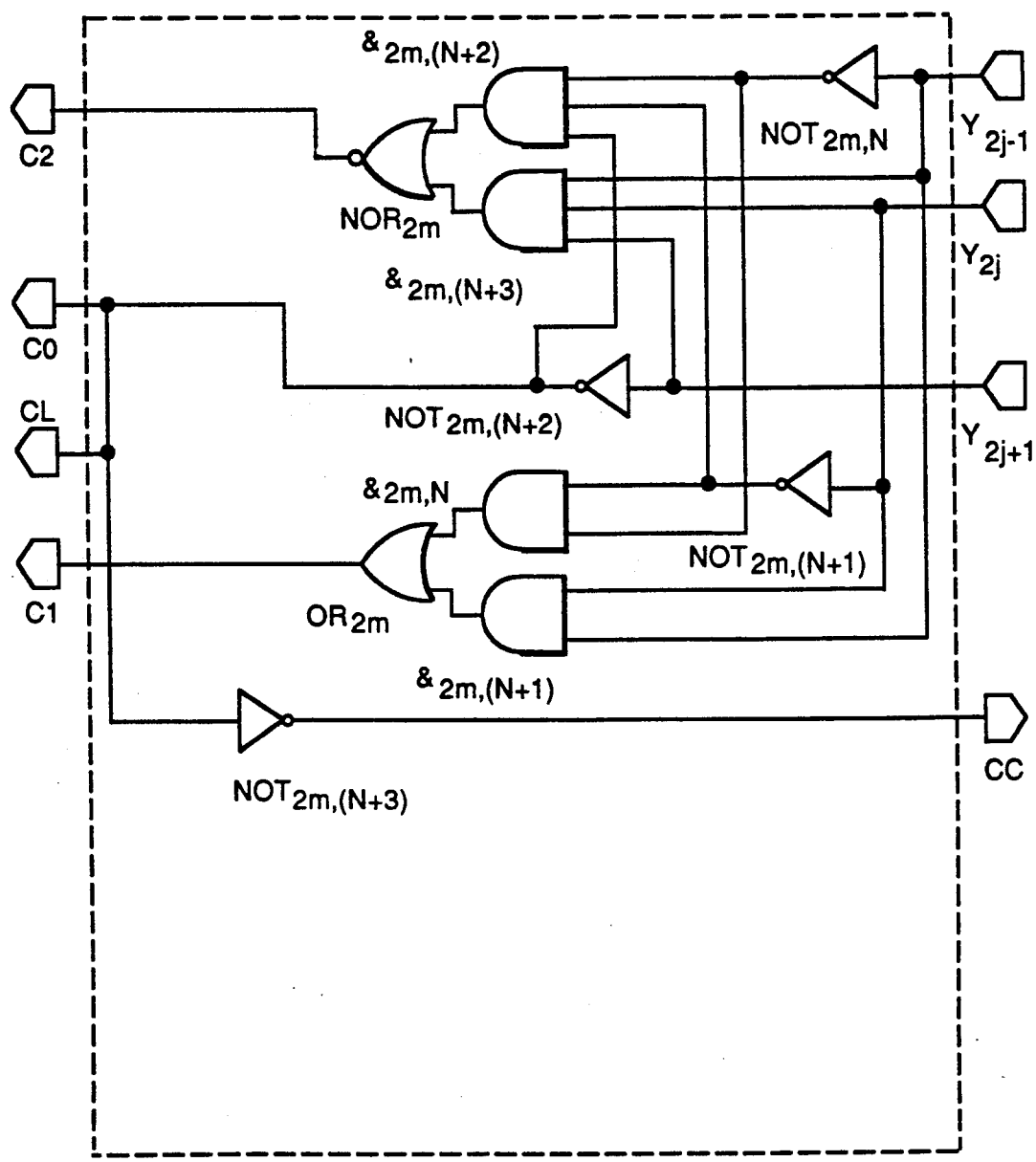
FIG. 3 is a schematic diagram of circuitry included in a basic cell used in the FIG. 1 array multiplier for performing a portion of the modified Booth encoding.

FIG. 3 shows a cell containing one arrangement of logic elements that generates the desired modified Booth encoding. Logic inverters $NOT_{2m,N}$, $NOT_{2m,(N+1)}$ and $NOT_{2m,(N+2)}$ complement repective ones of the three bits $Y_{2j-1}$, $Y_{2j}$ and $Y_{2j+1}$. The logic inverter $NOT_{2m,(N+2)}$ output signal corresponds to C0 Booth code value.

An AND gate $\&_{2m,N}$ responds to the output signals of the logic inverters $NOT_{2m,N}$ and $NOT_{2m,(N+1)}$ to generate a ONE only when both of the bits $Y_{2j-1}$ and $Y_{2j}$ are ZEROs. An AND gate $\&_{2m,(N+1)}$ responds to the bits $Y_{2j-1}$ and $Y_{2j}$ to generate a ONE only when both of them are ONEs. An OR gate $OR_{2m}$ responds to the output signals of AND gate $\&_{2m,N}$ and AND gate $\&_{2m,(N+1)}$ to generate C1 Booth code value, which is a ONE when the bits $Y_{2j-1}$ and $Y_{2j}$ are alike and is a ZERO when the bits $Y_{2j-1}$ and $Y_{2j}$ differ from each other.

An AND gate $\&_{2m,(N+2)}$ responds to the output signals of the logic inverters $NOT_{2m,N}$, $NOT_{2m,(N+1)}$ and $NOT_{2m,(N+2)}$ to generate a ONE only when all three bits $Y_{2j-1}$, $Y_{2j}$ and $Y_{2j+1}$ are ZEROs. An AND gate $\&_{2m,(N+3)}$ responds to bits $Y_{2j-1}$, $Y_{2j}$ and $Y_{2j+1}$ to generate a ONE only when all three are ONEs. A NOR gate $NOR_{2m}$ responds to the output signals of AND gate $\&_{2m,(N+2)}$ and AND gate $\&_{2m,(N+3)}$ to generate C2 Booth code value, which is a ONE except when the three bits $Y_{2j-1}$, $Y_{2j}$ and $Y_{2j+1}$ are all ZEROs or are all ONEs.

A signal CL which is equal to CO is generated, and is to be passed to the CR input of the decoder/adder gestalt cell $G_{2m,0}$. Furthermore, CL is inverted by inverter $NOT_{2m,(N+3)}$ and connected to output pin CC, which in turn is connected by an exterior connection to a first summand bit for a respective adder cell $A_{2m,N}$. It is desirable to locate the column of adders $A_{2m,N}$ on the right hand side of the rectangular array of decoder/adder gestalt cells, as shown in FIG. 1, to reduce the length of the connections from the array of $G_{2m,0}$ and $G_{2m,1}$ decoder/adder cells to the column of adders $A_{2m,N}$, m being a variable ranging over zero to $(M-1)$. It is desirable to keep as short as possible the connection for applying complemented CL signal from each Booth encoder cell $B_{2m}$ to the respective adder cell $A_{2m,N}$. It is also desirable to keep as short as possible the connection for CL signal from each Booth encoder cell $B_{2m}$ to the decoder/adder gestalt cell $G_{2m,0}$ in the same row. Accordingly, it is generally preferable to locate the column of Booth encoder cells $B_0, B_2 \ldots B_{2(M-1)}$ on the right hand side of the rectangular array of decoder/adder gestalt cells to avoid the need for running two additional lines per row across the array multiplier. However, where the array multiplier is located together with other digital circuitry on a monolithic integrated circuit, connections to which other circuitry are better arranged such that the array multiplier minor product is better supplied from the side of the array multiplier opposite the side across which multiplier input signal is supplied, it is as well to locate the column of Booth encoder cells $B_0, B_2 \ldots B_{2(m-1)}$ on the left hand side of the rectangular array of decoder/adder gestalt cells.

Figure 4:
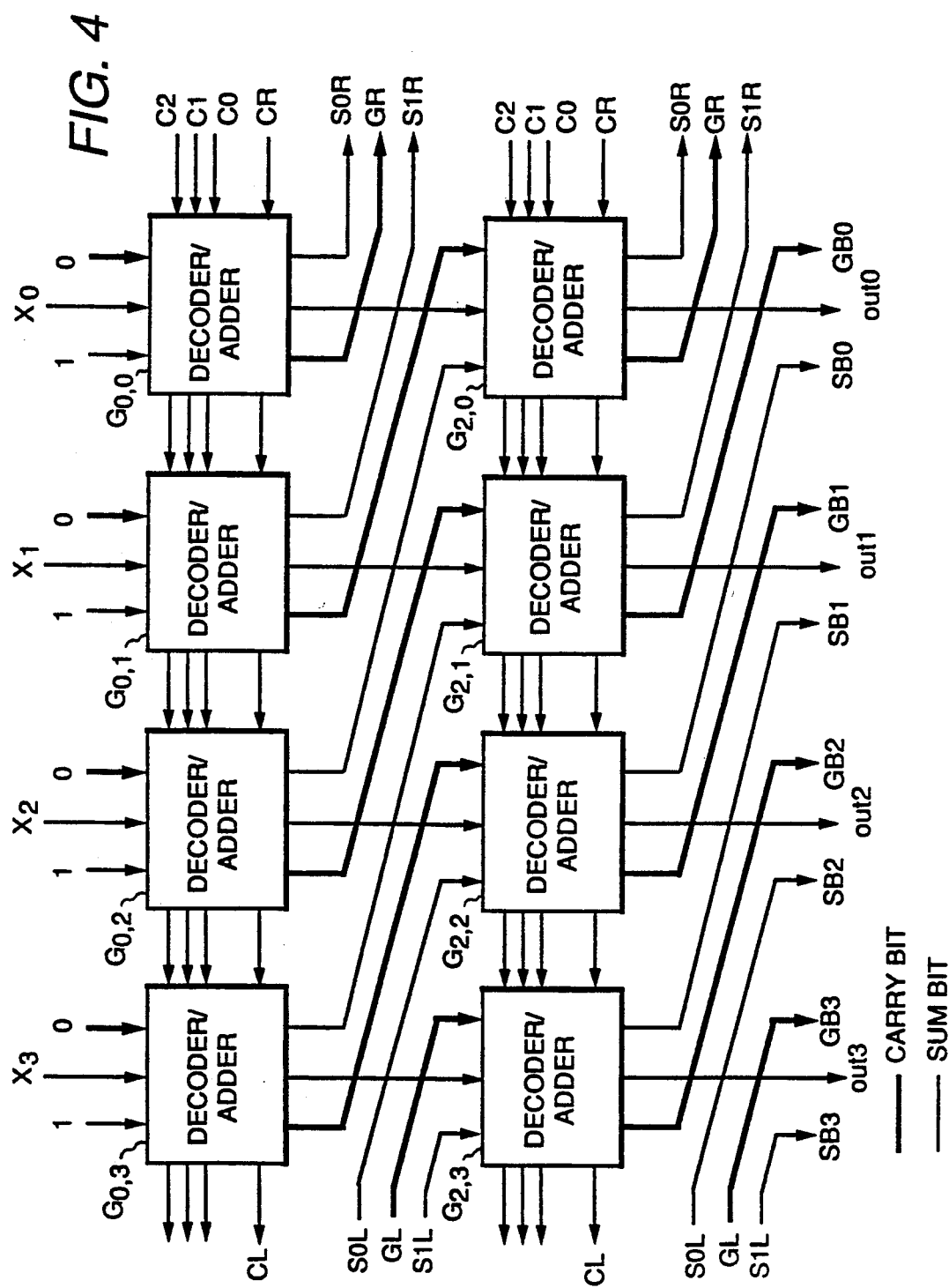
FIG. 4 is a schematic diagram of a plurality (or "chunk") of decoder/adder gestalt cells per FIG. 2 arranged by row and by column into a rectangular array as used for the core of the FIG. 1 array multiplier.

FIG. 4 shows a plurality of FIG. 2 decoder/adder gestalt cells arranged in a rectangular array of size $M \times N$, as provides the core of the FIG. 1 array multiplier, where 2M is the number of bits in the multiplier Y and N is the number of bits in the multiplicand X. The correct decoder/adder gestalt cells in each row have as inputs the multiplicand input, X, one bit per cell, and the three bits, C0, C1 and C2 representing the encoded digit for that row. The purpose of the decoder/adder gestalt cells is to generate the correct multiple, $-2X, -X, 0, X$ or $2X$ of the multiplicand. To allow values $2X$ and $-2X$ to be generated by a one place shift left, where possible, each decoder/adder gestalt cell $G_{2m,n}$ first generates a value $-X$, X or 0, which is passed down and right to the cell $G_{2(m+1),(n-1)}$. The C1 bit of the encoded digit determines whether to select the shifted or unshifted value. At the right hand end of the array, in each row, the value of CL from the Booth encoder cell is passed as a shift-in signal to the CR input of the rightmost decoder/adder gestalt cell. At the left hand end of the array, in each row, the final shift out passes out from the CL output of the leftmost decoder/adder gestalt cell, to be used as will be described further on in this specification.

To generate $-X$ and $-2X$, the bits of X are inverted, which means that a correction must be made in the least significant bit to get the correct negative. This correction is done later in the final adder by passing the value CC as a summand input to one of the two adder cells associated with the same row as the Booth encoder cell. The partial product generated by the decoder portions of the gestalt cells is added to the accumulated product by the adder portions of the gestalt cells in the row. A carry-save addition is used, meaning that both sum and carry bits are saved. Each array position has a binary weight $2^k$ associated with it. This weight is defined such that the position (i,j) counting from (0,0) at the top right has weight $2^{i+2j}$, where i counts vertical columns and j counts horizontal rows. What this means is that a 1 input to an adder at a position with weight $2^k$ really represents the number $2^k$. Since each Booth-encoded digit represents two bits of the 2M-bit multiplier, Y, there are only M rows, as already stated. Each row has binary weight equal to four times the previous one. Consequently, the sum output from one row of the array of decoder/adder gestalt cells must be passed two places right and down into the next row, whereas the first carry output (which has double the weight) must be passed one place right and down. The second carry output is to the adder cell portion of the decoder/adder gestalt cell to the left.

At the end of the partial product accumulation, a sum word and a carry word obtain, since the accumulation of partial products is done saving both sum and carry bits in each adder cell $A_{2m,n}$. These two words are added together to obtain the final product. To obtain a $(2M+N)$-bit product, the summation forming the minor product is done in the adder cells $A_{0,N}$ through $A_{2M-1,N}$ and the summation forming the major product is done in the adder cells $A_{2M,0}$ through $A_{2M,(N-1)}$. In different embodiments of the invention different types of adder are used for the final addition. A ripple-carry final adder is suitable only for multipliers in which $2M+N$ is small and speed requirements are not demanding. In multipliers in which $2M+N$ is larger or in which speed requirements are more demanding, it is preferable to use a final adder of carry-select type, as will be described further on with reference to FIGS. 6–9.

The FIG. 1 array multiplier is provided with the correct connections for the hanging inputs of the FIG. 4 array of decoder/adder gestalt cells that forms its core. To get correct multiplication results, it is necessary to connect these inputs up carefully. The correct connections shown in FIG. 1 for these inputs are as follows. At the top of the array, besides the bits $X_i$ there are two inputs per bit position in order to make up to three the number of inputs to the top adder row. Generally, one of these two inputs per bit position (identified as GT and ST in the FIG. 2 schematic diagram of circuitry included in a decoder/adder gestalt cell) must be connected to receive a ONE value and the other to receive a ZERO value. Since the two inputs are equivalent, it does not matter which is connected to receive a ONE value and which is connected to receive a ZERO value. (However, if multiplication/accumulation is being done, one of the two inputs GT and ST per bit position will be connected always to receive a ONE value, and the other will be connected to receive a respective bit of the number being accumulated). On the left hand side of the array there are three inputs (S0L, S1L, GL) for each row of the array. These values are passed to the adders in the first two columns from the left of the array. In addition, the shift left output (CL) from the leftmost decoder/adder gestalt cell issues from the left of the add/decode array. The correct and necessary connection is to return this shift out value (CL) to the carry-in input (S0L) which connects to the cell one row down in the second column from the left. The other two values on the left both connect to adders in the leftmost column of the array. One of these connections should be set to a ONE value and one should be set to a ZERO. The carry in Yin to the low-order Booth encoder $B_0$ should be a ZERO. Finally, the carry in Cin to the first adder cell in the final addition chain should be a ONE, not a ZERO as might be expected.

Here is a brief justification of these input connections. The purpose of the input of ONE values at selected input locations is to ensure the correct results when some of the partial products are negative. Consider first the case of all partial products being positive. In this case, the shift out value (CL) from each decoder row is a ONE (since CL is inverted from the correct bit value). Along with the ONE inputs to the top row and left column of adders in the array, there will also be a ONE value input to each of the adders in the second from left column in the array. Taking account of the weights of these array locations, the total sum contributed by these ONE values is $$\sum_{p=0}^{2M+N-1} 2^p = 2^{2M+N} - 1.$$

Along with the ONE carry input to the Cin position, this makes a total contribution of $2^{2M+N}$ which lies beyond the range represented by the $2M+N$ bits of the result and so has no effect. Consider now the case of a partial product being negative, say in row 0. Let the bits of the partial product be $<a_{N-1}\ldots a_i \ldots a_0>$. Since the partial product is negative, the shift left output (CL) will be a ZERO, and hence the ONE adder input will be missing from array position (N−2,1) which has weight $2^N$. The net effect will be the same as if $2^N$ had been subtracted from the final result. The contribution of the partial sum is then $$-2^N + \sum_{i=0}^{N-1} a_i 2^i = -2^{N-1} + \sum_{i=0}^{N-2} a_i 2^i$$

which is equal to the twos complement numerical value of $<a_{(n-1)}\ldots a_0>$ since $a_{(N-1)}=1$.

By setting to ZERO the most significant bits of the multiplicand X and of the multiplier Y, one can achieve signed-magnitude multiplication. Mixed-mode multiplication wherein one of the operands is twos' complement and the other is signed-magnitude is also possible. When the array multiplier is not just a chunk of a larger array multiplier, the leftmost adder stage $A_{2m,(N-1)}$ in its final adder, such as adder stage $A_{2m,3}$ in the FIG. 1 array multiplier, may merely provide a one-bit sign extension allowing it to be dispensed with, shortening the product by one bit from $N+2M$ bits.

In high-density interconnect (HDI) technology a desire is to configure chunks of multiplier cells within a monolithic integrated circuit, so as to facilitate the formation of multipliers of selected sizes. The basic chunk consists of an M×N array of decoder/adder gestalt cells like the one shown in FIG. 1 sufficient to carry out a 2M×N multiplication. The requirement is to be able to connect an a×b matrix of chunks together together to form 2aM×bN multipliers. This is done by connecting an a×b matrix of chunks together. It is required that the chunks used to form the multipliers be physically adjacent so that communications between them can be made on the chip, rather than through HDI wires. For instance, a chip may contain a 4×4 array of 8×8 multiplier chunks. These chunks may be configured into a single 32×32 bit multiplier, or four separate 16×16 multipliers, sixteen separate 8×8 multipliers or some mixture of different sized multipliers which may be formed by partitioning the array. Since in the case where the chip is partitioned into multipliers which consist of a single chunk, each chunk will require its own set of Booth encoders and adders, the Booth encoders and adders are included with every chunk. Those adders which fall between chunks of the same multiplier will not be used. On the other hand, the Booth encoders will be used in each chunk. The Y multiplier inputs will be fed to each chunk and decoded locally. Hence, the C0, C1 and C2 inputs of the multiplier array will always be connected to the outputs of the local Booth encoding cell.

In forming arrays of multiplier chunks, the connections to the pins of the multiplier chunk shown in FIG. 2 vary depending on whether the chunk is on the edge of or in the middle of an array of chunks forming a single multiplier. Consider for example making a 16×16 multiplier by taking a 4×4 array of 4×4 multipliers as shown in FIG. 1 and connecting them together edge to edge, ignoring superfluous encoders and final adders. The following connections are necessary for every row or column (as appropriate) of each FIG. 4 chunk of the decode/encode array.

CR If the chunk is at the right of the array, connect to C0 output of the Booth encoder cell. Otherwise connect to CL of the chunk to the right.

GT If chunk is on the top, then connect to 1. Otherwise connect to GB of the chunk above.

ST If chunk is on the top, then connect to 0. Otherwise connect to SB of the chunk above.

S0L If chunk is on the left, then connect to CL of the same chunk. Otherwise, connect to the S0R of the chunk to the left.

S1L If chunk is on the left, then connect to 1. Otherwise, connect to the S1R of the chunk to the right.

GL If chunk is on the left, then connect to 0. Otherwise connect to GR of the chunk to the right.

X If chunk is on the top, then connect to the input mini-pad. Otherwise, connect to Xout of the chunk above.

Certain connections to the Booth encoder cells and the adder cells in the final adder must also be made taking into consideration the position of the chunk in the multiplier configuration. Study of the FIG. 1 array multiplier will make clear the nature of these modified connections, which are as follows.

Cin to bit 0. If chunk is on the top, then connect to 1. Otherwise, connect to Cout of bit 2M−1 of chunk above.

Cin to bit 2M. If chunk is on the right, then connect to Cout of Bit 2M−1 of the same chunk. Otherwise, connect to Cout of bit 2M+N−1 of the chunk to the right.

Yin If chunk is on the top, then connect to 0. Otherwise, connect to Yout of the chunk above.

To configure a chip containing an array of multiplier chunks into several independent multipliers it is only necessary to make the correct connections, as described above, to neighboring chunks, to fixed signals or to internal signals. These connections can be by using logical gates and multiplexers controlled by certain configuration pins.

Figure 5A:
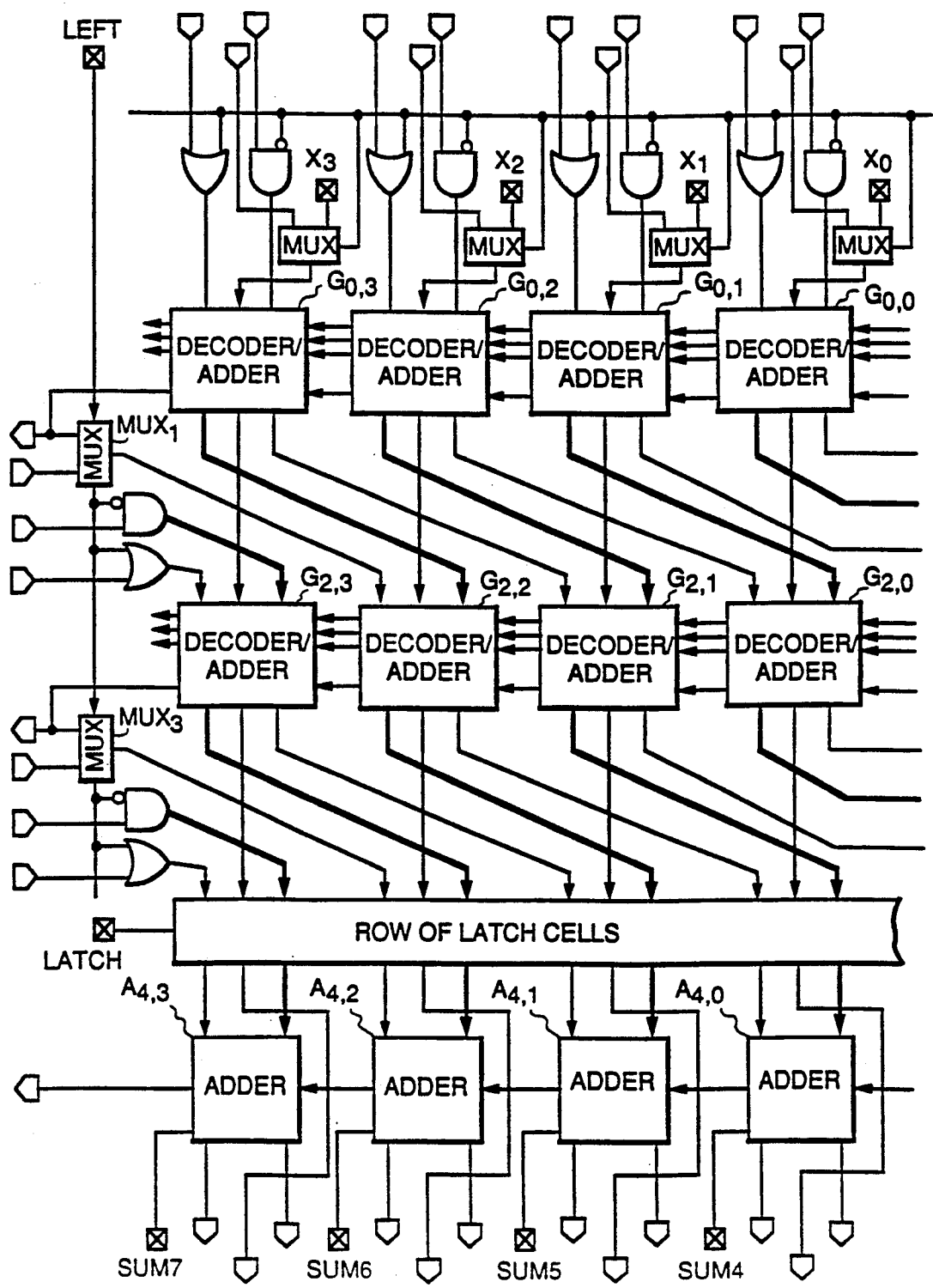
FIGS. 5A and 5B (referred to collectively as FIG. 5) are the left and right halves of a schematic diagram of a 4×4 chunk of array multiplier circuitry, which together with other such chunks, can be programmed to provide a variety of multiplier configurations.
Figure 5B:
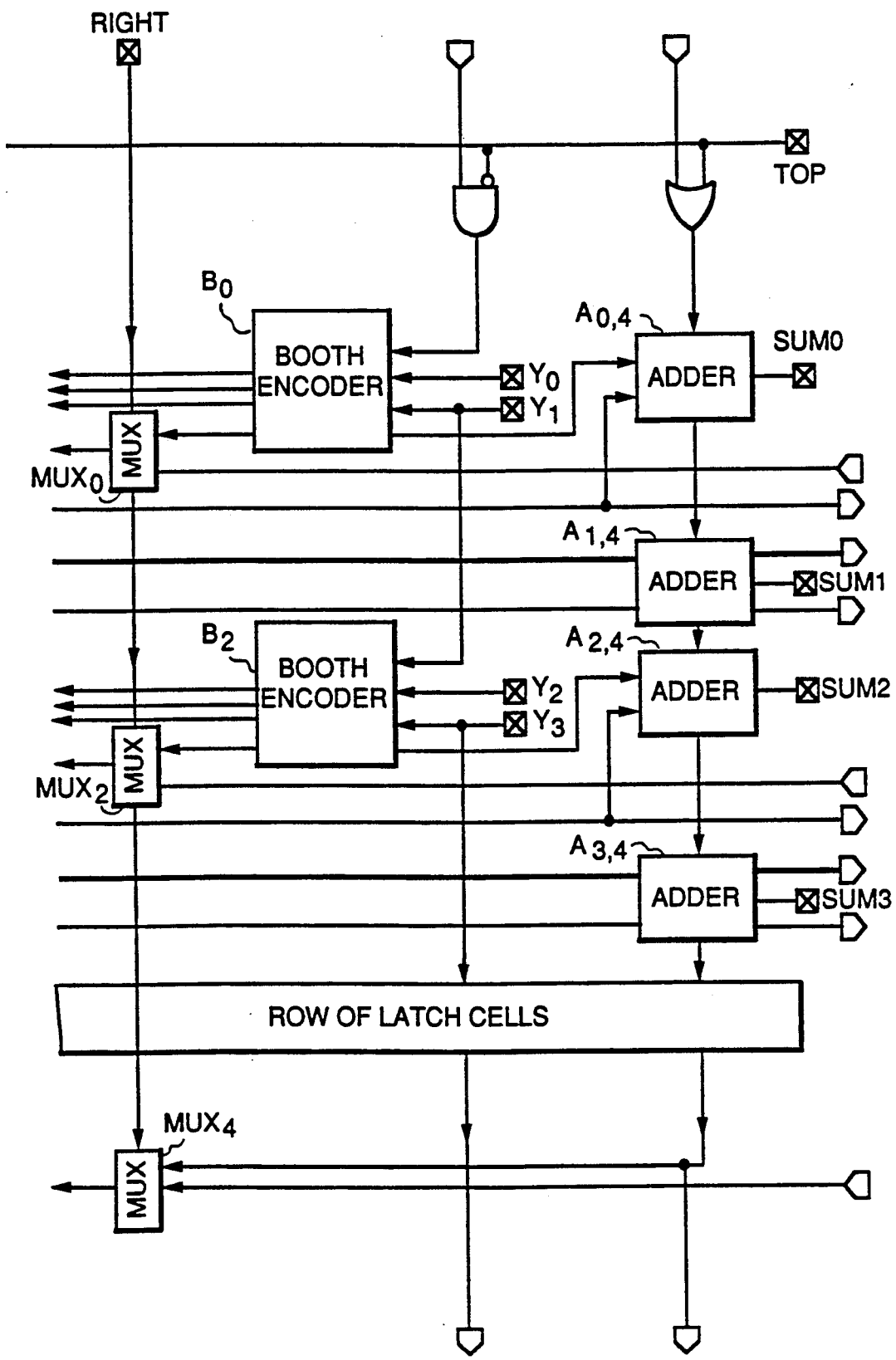

FIGS. 5A and 5B together show a single 4 ×4 bit multiplier chunk. The input/output to the chunk are of two types. The square pins marked with a cross, such as $X_0$, are mini-pads used for HDI connections (call these "hard input/output"). The pentagonal arrow-shaped pins are connected by top metallization directly to the correspondingly placed pin in the abutting chunk ("soft input/output"). The pentagonal arrow-shaped pins along the edges of the chip are not connected and tend to receive arbitrary values of signal. The summands to the adder cells are connected through the adder cells to respective soft outputs and connect to corresponding soft inputs in multiplier chunks to the right and to the bottom of the FIG. 5 chunk, presuming such other multiplier chunks exist. The second carry-out bits of the $(N-1)^{th}$ decoder/adder cells in each row are applied to respective soft outputs and connect to corresponding soft inputs in any multiplier chunks to the left of the FIG. 5 chunk. Apart from the mini-pad X and Y inputs and the SUM outputs, there are three configuration mini-pads, RIGHT, LEFT and TOP to which signals are applied indicating to each chunk whether it lies on the right, left or top border of a complete multiplier configured as an array of chunks. These signals control the values of the soft inputs to the chunk according to the rules given above. For instance, on the left side of the chunk shown in FIG. 5, the OR gate on the S1L line sets S1L to 1 if LEFT signal is 1, otherwise it passes the signal through from the adjacent chunk. The AND gate on the GL line, receptive of the logical complement of the LEFT signal, sets GL to 0 if LEFT signal is 1, otherwise it passes the signal through from the adjacent chunk. The other multiplexers, OR gates and AND gates on the soft inputs similarly implement the correct connections for these pins.

The row of multiplexers that select $X_i$ bits of the multiplicand signals to the $G_{0,n}$ decoder/adder cells avoids the need for making separate HDI connections for these bits to each chunk in a complete array multiplier. Note how the multiplexer $MUX_{2m}$ (here $MUX_4$) at the bottom right of FIG. 5B causes the final addition carry to ripple round the corner or to ripple across from the chunk to the right according to whether the RIGHT signal is high or not.

Variants of the circuitry for implementing the correct connections for the soft inputs are possible, of course. If the LEFT signal is 0 to indicate that the multiplier chunk is in a leftmost position in an array of multiplier chunks, the inverter for complementing the LEFT signal is in the OR gate inputs, rather than the AND gate inputs, for the gates at the left of FIG. 5A; and the input connections for the multiplexers at the left of FIG. 5A are reversed. Similarly, if the TOP signal is 0 to indicate that the multiplier chunk is in a topmost position in an array of multiplier chunks, the inverter for complementing the TOP signal is in the OR gate inputs, rather than the AND gate inputs, for the gates at the top of FIGS. 5A and 5B; and the input connections for the multiplexers at the top of FIG. 5A are reversed. If the RIGHT signal is 0 to indicate that the multiplier chunk is in a rightmost position in an array of multiplier chunks, the input connections for the multiplexers at the left of FIG. 5B are reversed. The individual logic complementation of the LEFT, TOP or RIGHT signal at individual gate inputs as thusfar described may be supplanted by a single logic inverter driving a complementary signal line supplying those individual gate inputs. The claims following this specification should be construed to extend their scope of protection over these variants, considered to be equivalents of the circuitry for connecting soft inputs shown in FIGS. 5A and 5B.

A further feature of the FIG. 5 multiplier chunk is the capability of carrying out pipelined multiplication. The box marked ROW OF LATCH CELLS near the bottom of the chunk contains a battery of optional single-clock-cycle delays, one for each of the signals crossing it except the RIGHT configuration signal. The hard input signal LATCH controls whether the signals are delayed for one clock cycle or are passed through immediately. In the case where the signals are delayed, there will be a time shift of one clock cycle from the computations above the delay to those below. This means, that all inputs must be delayed one clock cycle, and all outputs will be delayed one clock cycle. For instance, suppose that chunks are made up of 4×4 bits and that they are configured into a 16×16 bit multiplier by connecting a 4×4 array of chunks together. Suppose that the LATCH signal is high for every chunk. For correct operation of the multiplier, the successive groups of 4 bits of the Y input must be delayed by one cycle with respect to the previous one. The output SUM values will be similarly delayed.

Separate multiplications can be pipelined so that they overlap in time. The timing is

| | |
|---|---|
| $X_0 \ldots X_{15}$ | $t = 0$ |
| $Y_0 \ldots Y_3$ | $t = 0$ |
| $Y_4 \ldots Y_7$ | $t = 1$ |
| $Y_8 \ldots Y_{11}$ | $t = 2$ |
| $Y_{12} \ldots Y_{15}$ | $t = 3$ |
| SUM0 ... SUM3 | $t = 0$ |
| SUM4 ... SUM7 | $t = 1$ |
| SUM8 ... SUM11 | $t = 2$ |
| SUM12 ... SUM15 | $t = 3$ |
| SUM16 ... SUM31 | $t = 4$ |

This may be an impractical timing arrangement. A more usual case would be that the LATCH signal is high in the final row of chunks only. In this case, the final addition of the major product bits is delayed. There is only a two stage pipeline with input/output timing as follows.

| | |
|---|---|
| $X_0 \ldots X_{15}$ | $t = 0$ |
| $Y_0 \ldots Y_{15}$ | $t = 0$ |
| SUM0 ... SUM15 | $t = 0$ |
| SUM16 ... SUM31 | $t = 1$ |

The purpose of this pipelining is to achieve a higher clock speed than would be possible with a single combinational multiplier.

A variant of the FIG. 5 multiplier chunk relocates the respective latch cells for the $X_i$ bits after the respective input multiplexers for selecting these bits and previous to the respective columns of decoder/adder cells supplied by those bits. The latch cells can then serve as input latches for the topmost rank of multiplier chunks in the complete array multiplier.

Multiplier chunks that accept multiplicand signal segments with more than four bits, that accept multiplier signal segments with more than four bits, and that are constructed in accordance with the same precepts as the FIG. 5 4×4 multiplier chunk may be arrayed on a monolithic integrated circuit die. The same precepts may be used to make a very large array multiplier, chunks of which occupy respective monolithic integrated circuit dies.

Figure 7:
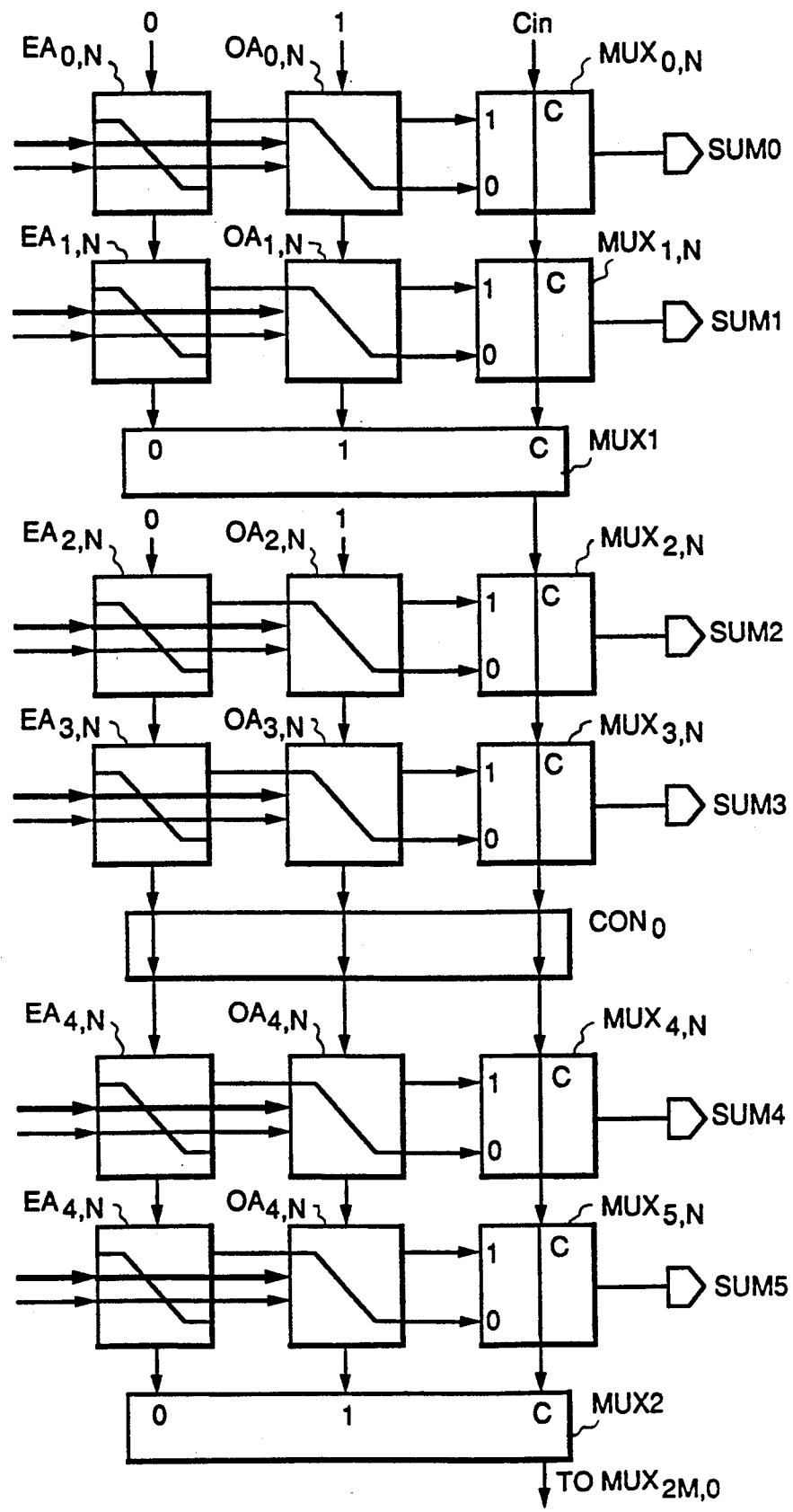
FIGS. 7 and 8 are expanded portions of FIG. 6.
Figure 8:
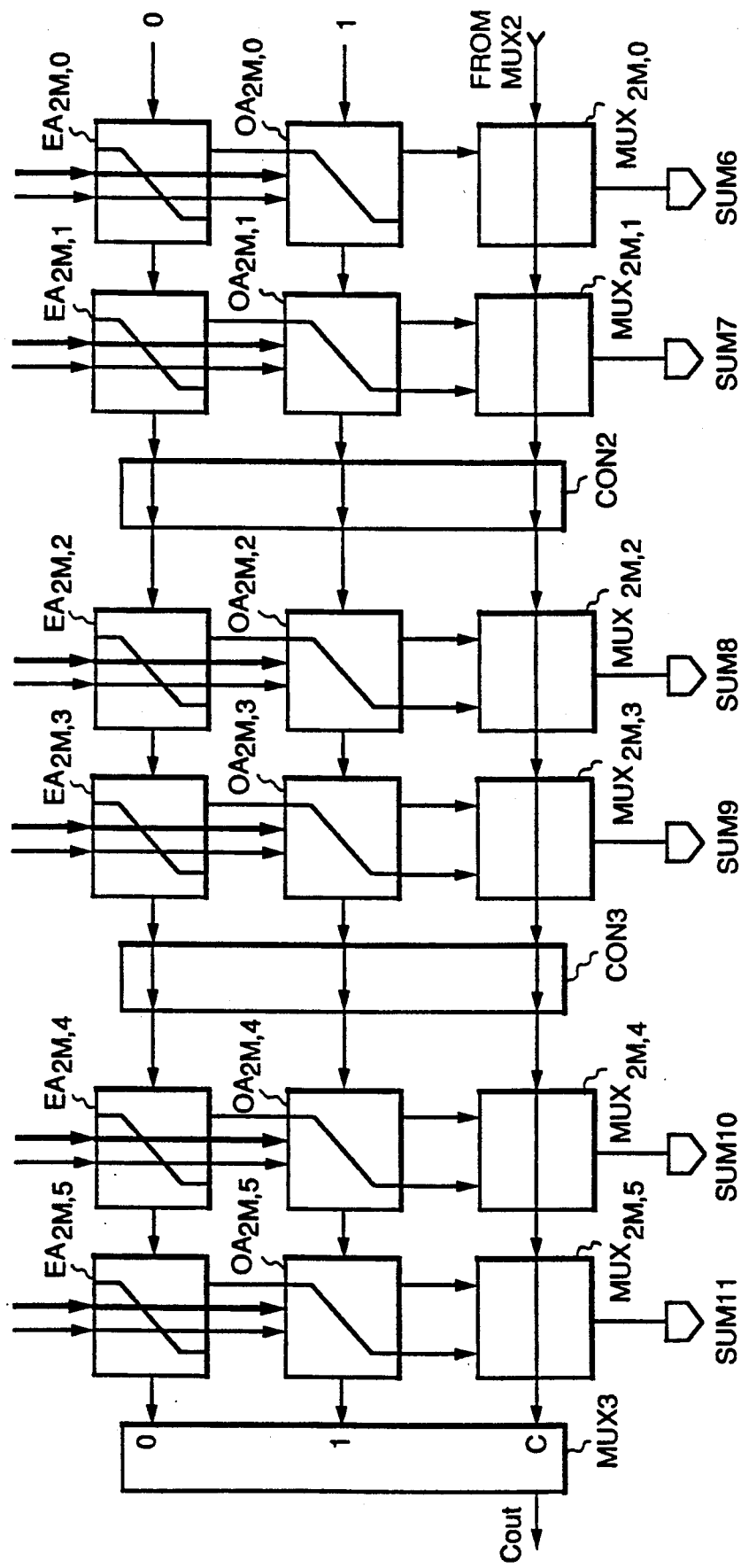

FIG. 6 shows a 6×6 array multiplier which, except for using a carry-select final adder rather than a ripple-carry final adder, is of the same general type as the FIG. 1 array multiplier. FIGS. 7 and 8 show in greater detail respective portions of the carry-select adder that is the final adder for a 6×6 array multiplier. In an adder of carry-select type, the chain of adders is segmented into subchains and each subchain is duplicated. In each duplicate pair, one subchain adds as if its carry-in were a ZERO and the other subchain adds as if its carry-in were a ONE. When the actual carry-in for the chain segment is actually available, it is then used to select the one of the outputs of the duplicate pair of subchains that is the appropriate output for the chain segment. It is also used to select the proper carry-out from the two adders at the ends of the subchain and its duplicate, to be supplied as carry-in to the following subchain and its duplicate. Each succeeding pair of subchains can contain (and preferably does contain) one or a few more adder cells than the immediately preceding pair, since the propagation time for the successive carry-select signals through the multiplexers in the final adder affords progressively more time for summing before carry-select signal is available for the succeeding pair of subchains. The final pair of subchains may contain a reduced number of adder cells, of course. In FIGS. 7–8 each succeeding pair of subchains is shown as containing two more adder cells than the immediately preceding pair.

FIGS. 7–8 show each of the ripple-carry adder cells $A_{m,N}$ in the final adder of a FIG. 1 type of array multiplier being replaced by a respective "even" adder cell $EA_{m,N}$ included in a subchain having a ZERO applied thereto as carry-in, a respective "odd" adder cell $OA_{m,N}$ included in a subchain having a ONE applied thereto as carry-in, and a multiplexer $MUX_{m,N}$ for selecting one of the sum bits from the "even" adder cell $EA_{m,N}$ and the "odd" adder cell $OA_{m,N}$. Each of the ripple-carry adder cells $A_{2M,n}$ in the final adder of a FIG. 1 type of array multiplier is replaced by a respective "even" adder cell $EA_{2M,n}$ included in a subchain having a ZERO applied thereto as carry-in, a respective "odd" adder cell $OA_{2M,n}$ included in a subchain having a ONE applied thereto as carry-in, and a multiplexer $MUX_{2M,n}$ for selecting one of the sum bits from the "even" adder cell $EA_{2M,n}$ and the "odd" adder cell $OA_{2M,n}$. A respective two-cell adder chain constitutes each of the first pair of subchains, and a multiplexer $MUX_1$ selects one of their carries-out to the second pair of subchains. A respective four-cell adder chain constitutes each of the second pair of subchains, and a multiplexer $MUX_2$ selects one of their carries-out to the third pair of subchains. A respective six-cell adder chain constitutes each of the third pair of subchains, and a multiplexer $MUX_3$ for selecting one of their carries-out as the product overflow $C_{out}$ from the array multiplier. Cells $CON_1$, $CON_2$ and $CON_3$ provide connections across gaps in the final adder, so the silicon compiler does not have to perform connection routing procedures in laying out the array multiplier. In a 6×6 array multiplier, the corner connection between the minor-product-generating and major-product-generating portions of the final adder occurs where only a single-wire connection needs to be carried forward for carry-select signal. This single-wire corner connection can be made using a wire routing routine of the silicon compiler, or a corner cell can be added to the silicon compiler cell library so the connection can be provided as part of a tiling procedure. In certain other-size array multipliers the corner connection between the minor-product-generating and major-product-generating portions of the final adder occurs where a three-wire connection needs to be carried forward.

Figure 9:
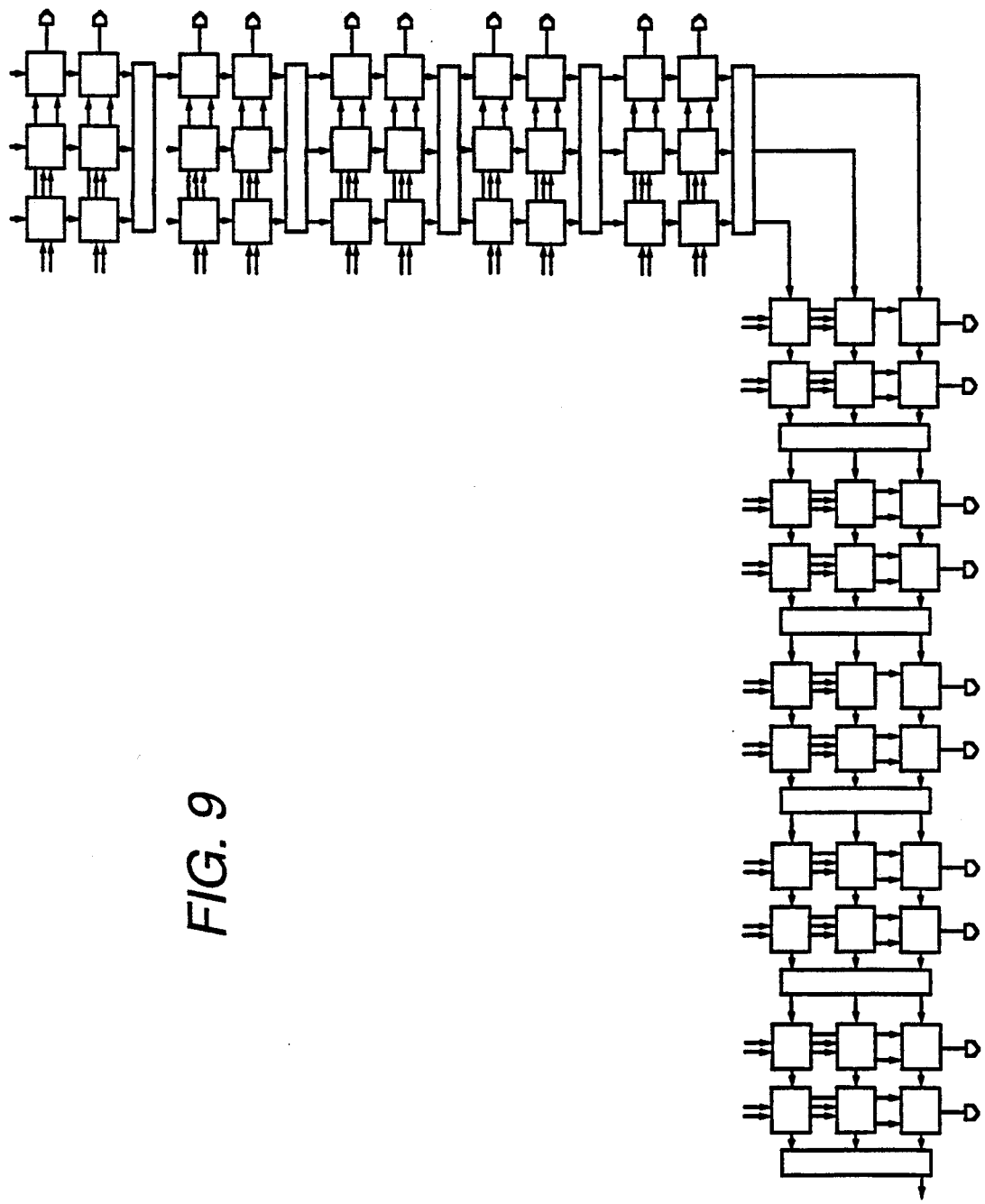
FIG. 9 is a schematic diagram of a carry-select final adder for a 10×10 array multiplier.

FIG. 9 shows a carry-select adder that is the final adder for a 10×10 array multiplier. The 10×10 array multiplier, except for using a carry-select final adder rather than a ripple-carry final adder, is presumed to be of the same general type as the FIG. 1 array multiplier. In this 10×10 array multiplier the corner connection between the minor-product-generating and major-product-generating portions of the final adder occurs is perforce a three-wire connection as shown in FIG. 9.

The foregoing disclosure will enable one skilled in the art to design a number of variations of the array multipliers as thusfar described, which variations also embody the invention; and the claims which follow should be construed so as to include such embodiments of the invention within the scope of protection these claims collectively afford. For example, chunks of digital multiplier using carry-select final adders are such embodiments of the invention.

What is claimed is:

1. A digital multiplier constructed along the surface of a monolithic integrated circuit die, said digital multiplier for multiplying N-bit multiplicands by 2M-bit multipliers, M and N being respective positive integers that may be the same or may differ from each other, M*N being the product of the integers M and N, the bits of said multiplicand being identified by respective ones of the consecutive ordinal numbers zeroeth through $(N-1)^{th}$ assigned in order of ascending significance, said digital mutiplier comprising:

means for appending a bit as least significant bit to said 2M-bit multiplier to form an extended multiplier;

a plurality M in number of Booth encoder cells arranged in a column extending in a first direction along the surface of said monolithic integrated circuit die, each Booth encoder cell responding to three bits of said extended multiplier to generate respective C0 and C1 and C2 code bits, said Booth encoder cells being identified by respective ones of the consecutive even ordinal numbers zeroeth through $2(M-1)^{th}$, each said Booth encoder cell identified by a higher ordinal number encoding bits of said extended multiplier of signifiance equal to or greater than the bits encoded by said encoder identified by next lower ordinal number;

respective zeroeth and first and second Booth-code lines extending from each said Booth encoder cell in a second direction along the surface of said monolithic integrated circuit die perpendicular to said first direction, for applying the C0 and C1 and C2 code bits from that said Booth encoder cell;

M*N Booth decoder/adder cells, a respective row of N said Booth decoder/adder cells associated with each said Booth encoder cell being identified by the same ordinal number as said Booth encoder cell with which it is associated, being located along said zeroeth and first and second Booth-code lines extending from said Booth encoder cell with which it is associated, and connecting from said zeroeth and first and second Booth-code lines, the N said Booth decoder/adder cells in each row being identified by respective ones of the consecutive ordinal numbers zeroeth through $(N-1)^{th}$ assigned in order of the serial locations of each n said Booth decoder/adder cells within a said row, each Booth decoder/adder circuit receiving as an input signal thereto the bit of said multiplicand identified by a corresponding ordinal number as supplied thereto from a respective multiplicand bit bus extending in said first direction, each Booth decoder/adder cell capable of receiving first and second summand bits and a carry-in bit, each Booth decoder/adder cell capable of generating a sum bit, a first carry-out bit of twice the significance of its sum bit and a second carry-out bit;

a plurality 2M in number of adder cells arranged in a column paralleling said column of M Booth encoder cells, each adder cell capable of receiving first and second summand bits and a carry-in bit, each adder cell capable of generating a sum bit and a carry-out bit of twice the significance of its sum bit, said adder cells identified within their column by consecutive ordinal numbers zeroeth through $(2M-1)^{th}$;

a plurality N in number of further adder cells arranged in a row parallelling said $2(M-1)^{th}$ row of N said Booth decoder/adder cells, said further adder cells identified within their row by consecutive ordinal numbers zeroeth through $(N-1)^{th}$, each further adder cell capable of receiving at least a first summand bit and a carry-in bit, each of said zeroeth through $(N-1)^{th}$ further adder cells capable of receiving a second summand bit, and each further adder cell capable of generating a sum bit and a carry-out bit of twice the significance of its sum bit;

means for applying the complement of the respective C0 code bit generated by each of said zeroeth through $2(M-1)^{th}$ Booth encoder cells as the first summand bit of the adder cell in said column of adder cells that is identified by the same ordinal number as the Booth encoder cell generating that C0 code bit; and means for connecting said cells to complete said digital multiplier.

2. A digital multiplier as set forth in claim 1 wherein said means for connecting said cells to complete said digital multiplier comprises:

electrical connections within each said row for applying the second carry-out bit of each of said zeroeth through (N−2) th Booth decoder/adder cells as the carry-in bit of the Booth decoder/adder cell with next higher ordinal number;

a respective electrical connection for applying the first carry-out bit of each of said first through $(N-1)^{th}$ Booth decoder/adder cells in each said row except said $2(M-1)^{th}$ row, as the first summand bit of said Booth decoder/adder cell that is identified by ordinal number next lower than the ordinal number of the Booth decoder/adder cell supplying its first carry-out bit thereto and that is located in said row identified by the ordinal number two higher than the row of the Booth decoder/adder cell supplying its first carry-out bit thereto;

a respective electrical connection for applying the respective sum bit of each of said second through $(N-1)^{th}$ Booth decoder/adder cells in each said row except said $2(M-1)^{th}$ row, as the second summand bit to said Booth decoder/adder cell that is identified by ordinal number two lower than the ordinal number of the Booth decoder/adder cell supplying its sum bit thereto and that is located in said row identified by the ordinal number two higher than the row of the Booth decoder/adder cell supplying its sum bit thereto;

a respective electrical connection for applying the sum bit of said zeroeth Booth decoder/adder cell in each said row, as the second summand bit of said adder cell in said column of adder cells that is identified by the same ordinal number as that identifying the row in which said zeroeth Booth decoder/adder cell is located;

a respective electrical connection for applying the first carry-out bit of said zeroeth Booth decoder/adder cell in each said row, as the first summand bit of said adder cell in said column of adder cells that is identified by the ordinal number one higher than that identifying the row in which said zeroeth Booth decoder/adder cell is located;

a respective electrical connection for applying the respective sum bit of said first Booth decoder/adder cell in each said row, as the second summand bit of said adder cell in said column of adder cells that is identified by the ordinal number one higher than that identifying the row in which said first Booth decoder/adder cell is located;

in said column of zeroeth through $(2M-1)^{th}$ adder cells, a respective electrical connection for applying the respective carry-out bit of each of said zeroeth through $2(M-1)^{th}$ adder cells as the respective carry-in bit of the one of said first through $(2M-1)^{th}$ adder cells identified by next higher ordinal number; and in said row of zeroeth through $(N-1)^{th}$ further adder cells, a respective electrical connection for applying the respective carry-out bit of each of said zeroeth through $(N-2)^{th}$ further adder cells as the respective carry-in bit of the one of said first through $(N-1)^{th}$ further adder cells identified by next higher ordinal number.

3. A digital multiplier as set forth in claim 2 wherein said means for connecting said cells to complete said digital multiplier further comprises:

a respective electrical connection for supplying the carry-in bit of said zeroeth Booth decoder/adder cell in each said row, from the zeroeth Booth-code line extending from said Booth encoder cell associated with said row;

a respective electrical connection for applying the second carry-out bit of said $(N-1)^{th}$ Booth decoder/adder cell in each said row except said $2(M-1)^{th}$ row, as the second summand bit of said $(N-2)^{th}$ Booth decoder/adder cell in said row identified by the ordinal number two higher;

an electrical connection for applying the second carry-out bit of said $(N-1)^{th}$ Booth decoder/adder cell in said $2(M-1)^{th}$ row, as the second summand bit of said $(N-2)^{th}$ further adder cell in said row of further adder cells;

a respective electrical connection for applying the first carry-out bit of each of said first through $(N-1)^{th}$ Booth decoder/adder cells in said $2(M-1)^{th}$ row, as the first summand bit of said further adder cell in said row of further adder cells that is identified by the ordinal number next lower than said Booth decoder/adder cell supplying its first carry-out bit thereto;

a respective electrical connection for applying the respective sum bit of each of said second through $(N-1)^{th}$ Booth decoder/adder cells in said $2(M-1)^{th}$ row, as the second summand bit of said further adder cell in said row of further adder cells that is identified by the ordinal number two lower than said Booth decoder/adder cell supplying its sum bit thereto; and an electrical connection for applying the carry-out bit of said $(2M-1)^{th}$ adder cell as the carry-in bit of said zeroeth further adder cell.

4. A digital multiplier as set forth in claim 3 including:

a respective pair of electrical connections for applying, to said $(N-1)^{th}$ Booth decoder/adder cell in each said row except said zeroeth row, a ONE and a ZERO as first and second summand bits; and a respective pair of electrical connections for applying, to said $(N-1)^{th}$ further adder cell, a ONE as one summand bit and a ZERO as any other of its summand bits.

5. A digital multiplier as set forth in claim 4 in combination with:

means for applying to each of said Booth decoder/adder cells in said zeroeth row a ZERO as a first summand bit; and means for applying a ONE as the carry-in bit for said zeroeth adder in said column of adders.

6. A digital multiplier as set forth in claim 4 in combination with:

means for applying to each of said Booth decoder/adder cells in said zeroeth row a ZERO as a first summand bit;

means for applying a ONE as the carry-in bit for said zeroeth adder in said column of adders; and means for applying to each of said Booth decoder/adder cells in said zeroeth row a ONE as a second summand bit.

7. A digital multiplier as set forth in claim 2 including:

means for receiving a control signal bit, said control signal bit when ONE indicating that said digital multiplier is on a side of a rectangular array of similar digital multipliers that is perpendicular to a side of the rectangular array to which bits of a multiplicand signal are to be applied;

a multiplexer cell for supplying the carry-in bit of said zeroeth further adder cell, which multiplexer cell is connected to receive said control signal bit, which multiplexer cell responds to said control signal bit being ONE to select a carry-out bit from said $(2M-1)^{th}$ adder cell as the carry-in bit of said zeroeth further adder cell and which multiplexer cell responds to said control signal bit being ZERO to select the carry-in bit of said zeroeth further adder cell as supplied via a respective carry-in connection; and a respective multiplexer cell for supplying the carry-in bit of said zeroeth Booth decoder/adder cell in each said row, which respective multiplexer cell is connected to receive said control signal bit, which respective multiplexer cell responds to said control signal bit being ONE to select the carry-in bit from the zeroeth Booth-code line extending from said Booth encoder cell associated with said row, and which respective multiplexer cell responds to said control signal bit being ZERO to select the carry-in bit as supplied via a respective carry-in connection.

8. A digital multiplier as set forth in claim 7 including:

respective means for applying, at least during first selected times, the second carry-out bit of said $(N-1)^{th}$ Booth decoder/adder cell in each said row except said $2(M-1)^{th}$ row, as the second summand bit of said $(N-2)^{th}$ Booth decoder/adder cell in said row identified by the ordinal number two higher;

means for applying, at least during said first selected times, the second carry-out bit of said $(N-1)^{th}$ Booth decoder/adder cell in said $2(M-1)^{th}$ row, as the second summand bit of said $(N-2)^{th}$ further adder cell in said row of further adder cells;

respective means for applying, at least during second selected times, the first carry-out bit of each of said first through $(N-1)^{th}$ Booth decoder/adder cells in said $2(M-1)^{th}$ row, as the first summand bit of said further adder cell in said row of further adder cells that is identified by the ordinal number next lower than said Booth decoder/adder cell supplying its first carry-out bit thereto; respective means for applying, at least during said second selected times, the respective sum bit of each of said second through $(N-1)^{th}$ Booth decoder/adder cells in said $2(M-1)^{th}$ row, as the second summand bit of said further adder cell in said row of further adder cells that is identified by the ordinal number two lower than said Booth decoder/adder cell supplying its sum bit thereto; and means for applying, at least during the concurrence of said first and second selected times, a ONE as one summand bit of said $(N-1)^{th}$ further adder cell and a respective ZERO as any other summand bit of said $(N-1)^{th}$ further adder cell.

9. A digital multiplier as set forth in claim 2 including:

means for supplying first and second summands to the Booth decoder/adder cells in said zeroeth row;

means for applying, at least during first selected times, a carry-out bit from said $(2M-1)^{th}$ adder cell as the carry-in bit of said zeroeth further adder cell;

means for applying, at least during said first selected times, the bit from the respective zeroeth Booth-code line extending from said Booth encoder cell associated with each said row as the carry-in bit of said zeroeth Booth decoder/adder cell in that said row;

respective means for applying, at least during second selected times, the first carry-out bit of each of said first through $(N-1)^{th}$ Booth decoder/adder cells in said $2(M-1)^{th}$ row, as the first summand bit of said further adder cell in said row of further adder cells that is identified by the ordinal number next lower than said Booth decoder/adder cell supplying its first carry-out bit thereto;

respective means for applying, at least during second selected times, the respective sum bit of each of said second through $(N-1)^{th}$ Booth decoder/adder cells in said $2(M-1)^{th}$ row, as the second summand bit of said further adder cell in said row of further adder cells that is identified by the ordinal number two lower than said Booth decoder/adder cell supplying its sum bit thereto;

means for receiving a first control signal bit that when ONE indicates that said digital multiplier is on a side of a rectangular array of similar digital multipliers that is perpendicular to a side of the rectangular array to which bits of a multiplicand signal are to be applied;

a respective multiplexer cell associated with the $(N-1)^{th}$ Booth decoder/adder cell in each said row except the $2(M-1)^{th}$, each multiplexer cell having an output connection for supplying the second summand bit of said $(N-2)^{th}$ Booth decoder/adder cell in the row identified by an ordinal number two more than the ordinal number identifying the row of the $(N-1)^{th}$ Booth decoder/adder cell with which that multiplexer cell is associated, each multiplexer cell having a first input connection to which the second carry-out bit of the $(N-1)$ th Booth decoder/adder cell associated therewith is applied and responding to said first control signal bit being a ONE for selectively supplying from its output connection the bit applied to its first input connection, and each multiplexer cell having a second input connection and responding to said first control signal bit being a ZERO for selectively supplying from its output connection the bit applied to its second input connection;

another multiplexer cell associated with the $(N-1)^{th}$ Booth decoder/adder cell in said $2(M-1)^{th}$ row, said other multiplexer cell having an output connection, said other multiplexer cell having a first input connection to which the second carry-out bit of the $(N-1)^{th}$ Booth decoder/adder cell associated therewith is applied and responding to said first control signal bit being a ONE for selectively supplying from its output connection the bit applied to its first input connection, and said other multiplexer cell having a second input connection and responding to said first control signal bit being a ZERO for selectively supplying from its output connection the bit applied to its second input connection;

means, responding to said first control signal bit being a ONE for applying a ONE as one summand bit of said $(N-1)^{th}$ further adder cell and a respective ZERO as any other summand bit of said $(N-1)^{th}$ further adder cell, and responding to said first control signal bit being a ZERO for supplying each summand bit of said $(N-1)^{th}$ further adder cell as applied to an input connection of said means;

means for applying, at least during said second selected times, the bit from the output connection of said other multiplexer cell as the second summand bit of said $(N-2)^{th}$ further adder cell;

means responding to said first control signal bit being a ONE for selectively supplying to the $(N-1)^{th}$ Booth decoder/adder cell in each said row except the zeroeth a ZERO and a ONE as the summands thereof; and means responding to said first control signal bit being a ZERO for selectively supplying externally supplied summands to the $(N-1)^{th}$ Booth decoder/adder cell in each said row except the zeroeth.

10. A digital multiplier as set forth in claim 9 including:

means for receiving a second control signal bit that when ONE indicates that said digital multiplier is on a side of a rectangular array of similar digital multipliers to which bits of a multiplicand signal are to be applied;

a plurality of two-input OR gates identified by consecutive ordinal numbers zeroeth through $N^{th}$ and included within said means for supplying first and second summands to the Booth decoder/adder cells in said zeroeth row, said zeroeth through $N^{th}$ OR gates having respective first input connections for receiving said second control signal bit and having respective second input connections, said zeroeth through $(N-1)^{th}$ OR gates having respective output connections for supplying the respective second summand bits for said Booth decoder/adder cells identified by corresponding ordinal numbers and located in said zeroeth row, said $N^{th}$ OR gate having a respective output connection for supplying the carry-in bit to said zeroeth adder cell in said column of adder cells; and a plurality of two-input AND gates identified by consecutive ordinal numbers zeroeth through $N^{th}$ and included within said means for supplying first and second summands to the Booth decoder/adder cells in said zeroeth row, said zeroeth through $N^{th}$ AND gates having respective first input connections connected to receive the logical complement of said second control signal and having respective second input connections, said zeroeth through $(N-1)^{th}$ AND gates having respective output connections for supplying the respective first summand bits for said Booth decoder/adder cells identified by corresponding ordinal numbers and located in said zeroeth row, said $N^{th}$ AND gate having a respective output connection for supplying the least significant bit appended to said 2M-bit multiplier to form an extended multiplier.

11. A digital multiplier as set forth in claim 2 including:

means for receiving a control signal bit that when ONE indicates that said digital multiplier is on a side of a rectangular array of similar digital multipliers to which bits of a multiplicand signal are to be applied;

a plurality of two-input OR gates identified by consecutive ordinal numbers zeroeth through $N^{th}$ having respective first input connections to receive said control signal bit and having respective second input connections, said zeroeth through $(N-1)^{th}$ OR gates having respective output connections for supplying the respective second summand bits for said Booth decoder/adder cells identified by corresponding ordinal numbers and located in said zeroeth row, said $N^{th}$ OR gate having a respective output connection for supplying the carry-in bit to said zeroeth adder cell in said column of adder cells; and a plurality of two-input AND gates identified by consecutive ordinal numbers first through $N^{th}$ having respective first input connections connected to receive the logical complement of said control signal bit and having respective second input connections, said zeroeth through $(N-1)^{th}$ AND gates having respective output connections for supplying the respective first summand bits for said Booth decoder/adder cells identified by corresponding ordinal numbers and located in said zeroeth row, said $N^{th}$ AND gate having a respective output connection for supplying the least significant bit appended to said 2M-bit multiplier to form an extended multiplier.

12. A digital multiplier as set forth in claim 2 constructed along the surface of a monolithic integrated circuit, which surface is bounded by four substantially straight sides of said monolithic integrated circuit, a first and a third of which four sides are parallel to each other, a second and a fourth of which four sides are parallel to each other and are perpendicular to the first and third sides, in which digital multiplier said column of Booth encoder cells is flanked by said column of adder cells and a column of said Booth decoder/adder cells, said column of adder cells is disposed near the first side of said monolithic integrated circuit, said zeroeth row of Booth decoder/adder cells is disposed near the second side of said monolithic integrated circuit, a column of said $(N-1)^{th}$ Booth decoder/adder cells is disposed near the third side of said monolithic integrated circuit, and said row of further adder cells is disposed near the fourth side of said monolithic integrated circuit.

13. A digital multiplier as set forth in claim 12 including:

means for receiving a first control signal bit that when ONE indicates that said digital multiplier is on a side of an array of similar digital multipliers such that its first side is not adjoined by the third side of another digital multiplier;

means for receiving a second control signal bit that when ONE indicates that said digital multiplier is on a side of an array of similar digital multipliers such that its second side is not adjoined by the fourth side of another digital multiplier;

means for receiving a third control signal bit that when ONE indicates that said digital multiplier is on a side of an array of similar digital multipliers such that its third side is not adjoined by the first side of another digital multiplier;

a plurality of two-input multiplexer cells respectively identified by consecutive ordinal numbers zeroeth through $2M^{th}$, ones of said multiplexer cells identified by even ordinal numbers less than $2M^{th}$ being connected for selecting the carry-in bit of said zeroeth Booth decoder/adder cell for said row identified by the same ordinal number, each of said multiplexer cells identified by even ordinal numbers less than $2M^{th}$ responding to said first control signal bit being ONE to select the carry-in bit from the zeroeth Booth-code line extending from said Booth encoder cell identified by the same ordinal number, each of said multiplexer cells identified by even ordinal numbers less than $2M^{th}$ responding to said first control signal bit being ZERO to select the carry-in bit as supplied via a respective carry-in connection, ones of said multiplexer cells identified by odd ordinal numbers less than $2(M-1)^{th}$ being connected for supplying the second summand bit of said $(N-2)^{th}$ Booth decoder/adder cell for said row identified by the next higher ordinal number, each of said multiplexer cells identified by odd ordinal numbers less than $2(M-1)^{th}$ responding to said third control signal bit being ONE to select the second-carry-out bit from said $(N-1)^{th}$ Booth encoder cell in said row identified by the next lower ordinal number, each of said multiplexer cells identified by odd ordinal numbers less than $2(M-1)^{th}$ responding to said third control signal bit being ZERO to select the carry-in bit as supplied via a respective connection point, said $(2M-1)^{th}$ multiplexer cell being connected for supplying the second summand bit of said $(N-2)^{th}$ further adder cell in said row of further adder cells, said $(2M-1)^{th}$ multiplexer cell responding to said third control signal bit being ONE to select the second-carry-out bit from said $(N-1)$ th Booth encoder cell in said $2(M-1)^{th}$ row, and said $(2M-1)^{th}$ multiplexer cell responding to said third control signal bit being ZERO to select the second summand bit as supplied via a respective connection point, said $2M^{th}$ multiplexer cell being connected for selecting the carry-in bit of said zeroeth further adder cell, said $2M^{th}$ multiplexer cell responding to said first control signal bit being ONE to select a carry-out bit from said $(2M-1)^{th}$ adder cell as the carry-in bit of said zeroeth further adder cell, and said $2M^{th}$ multiplexer cell responding to said first control signal bit being ZERO to select the carry-in bit as supplied via a respective connection point;

an AND gate having a respective output connection for supplying the least significant bit appended to said 2M-bit multiplier to form an extended multiplier, having a respective first input connection to which the logical complement of said second control signal bit is applied, and having a respective second input connection;

a plurality of two-input AND gates having respective output connections for supplying the respective first summand bits for said Booth decoder/adder cells located in said zeroeth row, having respective first input connections to which the logical complement of said second control signal bit is applied, and having respective second input connections;

a plurality of two-input AND gates having respective output connections for supplying the respective first summand bits for each of said $(N-1)^{th}$ Booth decoder/adder cells located in rows other than said zeroeth row, having respective first input connections to which the logical complement of said third control signal bit is applied, and having respective second input connections;

an AND gate having a respective output connection for supplying the first summand bit for said $(N-1)^{th}$ further adder cell in said row of further adder cells, having a respective first input connection to which the logical complement of said third control signal bit is applied, and having a respective second input connection;

an OR gate having a respective output connection for supplying the carry-in bit to said zeroeth adder cell in said column of adder cells, having a respective first input connection to which said second control signal bit is applied, and having a respective second input connection;

a plurality of two-input OR gates having respective output connections for supplying the respective second summand bits for each of said Booth decoder/adder cells located in said zeroeth row, having respective first input connections to which said second control signal bit is applied, and having respective second input connections;

a plurality of two-input OR gates having respective output connections for supplying the respective second summand bits for each of said $(N-1)^{th}$ Booth decoder/adder cells located in rows other than said zeroeth row, having respective first input connections to which said third control signal bit is applied, and having respective second input connections; and an OR gate having a respective output connection for supplying the second summand bit for said $(N-1)^{th}$ further adder cell in said row of further adder cells, having a respective first input connection to which said third control signal bit is third control signal bit is applied, and having respective second input connections;

an AND gate having a respective output connection for supplying the first summand bit for said $(N-1)^{th}$ further adder cell in said row of further adder cells, having a respective first input connection to which the logical complement of said third control signal bit is applied, and having a respective second input connection;

an OR gate having a respective output connection for supplying the carry-in bit to said zeroeth adder cell in said column of adder cells, having a respective first input connection to which said second control signal bit is applied, and having a respective second input connection;

a plurality of two-input OR gates having respective output connections for supplying the respective sound summand bits for each of said Booth decoder/adder cells located in said zeroeth row, having respective first input connections to which said second control signal bit is applied, and having respective second input connections;

a plurality of two-input OR gates having respective output connections for supplying the respective second summand bits for each of said $(N-1)^{th}$ Booth decoder/adder cells located in rows other than said zeroeth row, having respective first input connections to which said third control signal bit is applied, and having respective second input connections; and an OR gate having a respective output connection for supplying the second summand bit for said $(N-1)^{th}$ further adder cell in said row of further adder cells, having a respective first input connection to which said third control signal bit is applied, and having a respective second input connection.

14. A digital multiplier constructed along the surface of a monolithic integrated circuit die, which surface is bounded by four substantially straight sides of said monolithic integrated circuit, a first and a third of which four sides are parallel to each other, a second and a fourth of which four sides are parallel to each other and perpendicular to the first and third sides, said digital multiplier constructed as an array of chunks each for multiplying an N-bit multiplicand signal segment by a 2M-bit multiplier signal segment, M and N being respective positive integers that may be the same or may differ from each other, M*N being the product of the integers M and N, the bits of said multiplicand signal segment supplied to each chunk being identified by respective ones of the consecutive ordinal numbers zeroeth through $(N-1)^{th}$ assigned in order of ascending significance, each chunk of said digital mutiplier comprising:

means for appending a bit as least significant bit to said 2M-bit multiplier signal segment to form an extended multiplier signal segment;

a plurality M in number of Booth encoder cells arranged in a column extending along the surface of said monolithic integrated circuit die in a direction parallel to its first side, each Booth encoder cell responding to three bits of said extended multiplier signal segment to generate respective C0 and C1 and C2 code bits, said Booth encoder cells being identified by respective ones of the consecutive even ordinal numbers zeroeth through $2(M-1)^{th}$, each said Booth encoder cell identified by a higher ordinal number encoding bits of said extended multiplier signal segment of significance equal or greater than the bits encoded by said encoder identified by next lower ordinal number;

respective zeroeth and first and second Booth-code lines extending from each said Booth encoder cell along the surface of said monolithic integrated circuit die in a direction parallel to its second and fourth sides, for applying the C0 and C1 and C2 code bits from that said Booth encoder cell;

M*N Booth decoder/adder cells, a respective row of N said Booth decoder/adder cells associated with each said Booth encoder cell being identified by the same ordinal number as said Booth encoder cell with which it is associated, being located along said zeroeth and first and second Booth-code lines extending from said Booth encoder cell with which it is associated, and connecting from said zeroeth and first and second Booth-code lines, the N said Booth decoder/adder cells in each row being identified by respective ones of the consecutive ordinal numbers zeroeth through $(N-1)^{th}$ assigned in order of the serial locations of each N said Booth decoder/adder cells within a said row, each Booth decoder/adder circuit receiving as an input signal thereto the bit of said multiplicand signal segment identified by a corresponding ordinal number as supplied thereto from a respective multiplicand bit bus extending in said first direction, each Booth decoder/adder cell capable of receiving first and second summand bits and a carry-in bit, each Booth decoder/adder cell capable of generating a sum bit, a first carry-out bit of twice the significance of its sum bit and a second carry-out bit;

a plurality 2M in number of adder cells arranged in a column paralleling said column of M Booth encoder cells, each adder cell capable of receiving first and second summand bits and a carry-in bit, each adder cell capable of generating a sum bit and a carry-out bit of twice the significance of its sum bit, said adder cells identified within their column by consecutive ordinal numbers zeroeth through $(2M-1)^{th}$;

a plurality N in number of further adder cells arranged in a row extending along the surface of said monolithic integrated circuit die in a direction parallel to its first side, each further adder cell capable of receiving first and second summand bits and a carry-in bit, each further adder cell capable of generating a sum bit and a carry-out bit of twice the significance of its sum bit, said further adder cells identified within their row by consecutive ordinal numbers zeroeth through $(N-1)^{th}$;

means for applying the complement of the respective C0 code bit generated by each of said zeroeth through $2(M-1)^{th}$ Booth encoder cells as the first summand bit of the adder cell in said column of adder cells that is identified by the same ordinal number as the Booth encoder cell generating that C0 code bit;

electrical connections within each said row for applying the second carry-out bit of each of said zeroeth through $(N-2)^{th}$ Booth decoder/adder cells as the carry-in bit of the Booth decoder/adder cell with next higher ordinal number; and a respective electrical connection for applying the first carry-out bit of each of said first through $(N-1)^{th}$ Booth decoder/adder cells in each said row except said $2(M-1)^{th}$ row, as the first summand bit of said Booth decoder/adder cell that is identified by ordinal number next lower than the ordinal number of the Booth decoder/adder cell supplying its first carry-out bit thereto and that is located in said row identified by the ordinal number two higher than the row of the Booth decoder/adder cell supplying its first carry-out bit thereto;

a respective electrical connection for applying the respective sum bit of each of said second through $(N-1)^{th}$ Booth decoder/adder cells in each said row except said $2(M-1)^{th}$ row, as the second summand bit to said Booth decoder/adder cell that is identified by ordinal number two lower than the ordinal number of the Booth decoder/adder cell supplying its sum bit thereto and that is located in said row identified by the ordinal number two higher than the row of the Booth decoder/adder cell supplying its sum bit thereto;

a respective electrical connection for applying the sum bit of said zeroeth Booth decoder/adder cell in each said row, as the second summand bit of said adder cell in said column of adder cells that is identified by the same ordinal number as that identifying the row in which said zeroeth Booth decoder/adder cell is located;

a respective electrical connection for applying the first carry-out bit of said zeroeth Booth decoder/adder cell in each said row, as the first summand bit of said adder cell in said column of adder cells that is identified by the ordinal number one higher than that identifying the row in which said zeroeth Booth decoder/adder cell is located;

a respective electrical connection for applying the respective sum bit of said first Booth decoder/adder cell in each said row, as the second summand bit of said adder cell in said column of adder cells that is identified by the ordinal number one higher than that identifying the row in which said first Booth decoder/adder cell is located;

in said column of zeroeth through $(2M-1)^{th}$ adder cells, a respective electrical connection for applying the respective carry-out bit of each of said zeroeth through $2(M-1)^{th}$ adder cells as the respective carry-in bit of the one of said first through $(2M-1)^{th}$ adder cells identified by next higher ordinal number;

in said row of zeroeth through $(N-1)^{th}$ further adder cells, a respective electrical connection for applying the respective carry-out bit of each of said zeroeth through $(N-2)^{th}$ further adder cells as the respective carry-in bit of the one of said first through $(N-2)^{th}$ further adder cells identified by next higher ordinal number;

a first control line for receiving a ONE indicative that said multiplier chunk is on a side of an array of similar multiplier chunks such that its first side is not adjoined by the third side of another multiplier chunk;

a second control line for receiving a ONE indicative that said multiplier chunk is on a side of an array of similar multiplier chunks such that its second side is not adjoined by the fourth side of another multiplier chunk;

a third control line for receiving a ONE indicative that said multiplier chunk is on a side of an array of similar multiplier chunks such that its third side is not adjoined by the first side of another multiplier chunk;

a latch command line from which all hereinafter claimed latch cells receive respective latch instructions;

respective latch cells for temporarily storing the first and second summand bits for said $(N-1)^{th}$ further adder cell in said row of further adder cells;

a respective latch cell for temporarily storing the second summand bit for said $(N-2)^{th}$ further adder cell in said row of further adder cells;

a respective latch cell for applying the first carry-out bit of each of said first through $(N-1)^{th}$ Booth decoder/adder cells in said $2(M-1)^{th}$ row, as the first summand bit of said further adder cell in said row of further adder cells that is identified by the ordinal number next lower than said Booth decoder/adder cell supplying its first carry-out bit thereto;

a respective latch cell for applying the respective sum bit of each of said second through $(N-1)^{th}$ Booth decoder/adder cells in said $2(M-1)^{th}$ row, as the second summand bit of said further adder cell in said row of further adder cells that is identified by the ordinal number two lower than said Booth decoder/adder cell supplying its sum bit thereto;

a respective latch cell for latching the most significant bit of said extended multiplier signal segment;

a respective latch cell for latching the carry-out bit of said $(2M-1)^{th}$ adder cell in said column of adder cells;

a plurality of two-input multiplexer cells respectively identified by consecutive ordinal numbers zeroeth through $2M^{th}$, ones of said multiplexer cells identified by even ordinal numbers less than $2M^{th}$ being connected for selecting the carry-in bit of said zeroeth Booth decoder/adder cell for said row identified by the same ordinal number, each of said multiplexer cells identified by even ordinal numbers less than $2M^{th}$ responding to said first control signal bit being ONE to select the carry-in bit from the zeroeth Booth-code line extending from said Booth encoder cell identified by the same ordinal number, each of said multiplexer cells identified by even ordinal numbers less than $2M^{th}$ responding to said first control signal bit being ZERO to select the second-carry-out bit from said $(N-1)^{th}$ Booth decoder/adder cell located in any other multiplier chunk having its third side adjoining the first side of said multiplier chunk being specifically described in this recitation and more specifically located in said row identified by the same ordinal number as that said multiplexer cell, ones of said multiplexer cells identified by odd ordinal numbers less than $2(M-1)^{th}$ being connected for selecting the second summand bit of said $(N-2)^{th}$ Booth decoder/adder cell for said row identified by the next higher ordinal number, each of said multiplexer cells identified by odd ordinal numbers less than $2(M-1)^{th}$ responding to said third control signal bit being ONE to select the second carry-out bit from said $(N-1)^{th}$ Booth decoder/adder cell in said row identified by the next lower ordinal number, each of said multiplexer cells identified by odd ordinal numbers less than $2(M-1)^{th}$ responding to said third control signal bit being ZERO to select the sum bit of the zeroeth Booth decoder/adder cell located in any other multiplier chunk having its first side adjoining the third side of said multiplier chunk being specifically described in this recitation and more specifically located in its row identified by ordinal number one lower than said multiplexer cell, said $(2M-1)^{th}$ multiplexer cell being connected for selecting to its respective latch cell the second summand bit of said $(N-2)^{th}$ further adder cell in said row of further adder cells, said $(2M-1)^{th}$ multiplexer cell responding to said third control signal bit being ONE to select the second-carry-out bit from said $(N-1)^{th}$ Booth decoder/adder cell in said $2(M-1)^{th}$ row, and said $(2M-i)^{th}$ multiplexer cell responding to said third control signal bit being ZERO to select the sum bit of the zeroeth Booth decoder/adder cell located in any other multiplier chunk having its first side adjoining the third side of said multiplier chunk being specifically described in this recitation and more specifically located in its $2(M-1)^{th}$ row, said $2M^{th}$ multiplexer cell being connected for selecting the carry-in bit of said zeroeth further adder cell, said $2M^{th}$ multiplexer cell responding to said first control signal bit being ONE to select a carry-out bit from said $(2M-1)^{th}$ adder cell as stored in said respective latch cell to be the carry-in bit of said zeroeth further adder cell, and said $2M^{th}$ multiplexer cell responding to said first control signal bit being ZERO to select a carry-out bit from the $(N-1)^{th}$ further adder cell of any other multiplier chunk having its third side adjoining the first side of said multiplier chunk being specifically described in this recitation;

a plurality of two-input further multiplexer cells respectively identified by consecutive ordinal numbers zeroeth through $(N-1)^{th}$, each said further multiplexer cell arranged for selecting the multiplicand bit for each of said Booth decoder/adder cells identified by the same ordinal number, each said further multiplexer cell responding to said second control signal bit being ONE to select the multiplicand bit for each of said Booth decoder/adder cells identified by the same ordinal number as said further multiplexer cell as supplied to a respective bond pad disposed along the surface of said monolithic integrated circuit die, and each said further multiplexer cell responding to said second control signal bit being ZERO to select the multiplicand bit for each of said Booth decoder/adder cells identified by the same ordinal number as said further multiplexer cell as supplied to any other multiplier chunk having its fourth side adjoining the second side of said multiplier chunk being specifically described in this recitation and as delayed by a respective latch cell;

an AND gate having a respective output connection for supplying the least significant bit appended to said 2M-bit multiplier to form an extended multiplier signal segment, having a respective first input connection to which the logical complement of said second control signal bit is applied, and having a respective second input connection to which the most significant bit of any next less significant segment of the same multiplier signal is applied as delayed by a respective latch cell;

a plurality of two-input AND gates having respective output connections for supplying the respective first summand bits for said Booth decoder/adder cells located in said zeroeth row, having respective first input connections to which the logical complement of said second control signal bit is applied, and having respective second input connections for receiving a first of the sum and carry-out bits, as delayed by respective latch cells, from respective ones of further adder cells in any other multiplier chunk having its fourth side adjoining the second side of said multiplier chunk being specifically described in this recitation;

a plurality of two-input AND gates having respective output connections for supplying the respective first summand bits for each of said $(N-1)^{th}$ Booth decoder/adder cells located in rows other than said zeroeth row, having respective first input connections to which the logical complement of said third control signal bit is applied, and having respective second input connections for receiving first carry-out bits from respective ones of zeroeth Booth decoder/adder cells located in any other multiplier chunk having its first side adjoining the third side of said multiplier chunk being specifically described in this recitation and more specifically located in its rows identified by ordinal numbers two lower than the rows in which said $(N-1)^{th}$ Booth decoder/adder cells supplied respective second summand bits are located;

an AND gate having a respective output connection for supplying the first summand bit for said $(N-1)^{th}$ further adder cell in said row of further adder cells, having a respective first input connection to which the logical complement of said third control signal bit is applied, and having a respective second input connection for receiving the carry-out bit from the zeroeth Booth decoder/adder cell in the $2(M-1)^{th}$ row of any other multiplier chunk having its third side adjoining the first side of said multiplier chunk being specifically described in this recitation;

an OR gate having a respective output connection for supplying the carry-in bit to said zeroeth adder cell in said column of adder cells, having a respective first input connection to which said second control signal bit is applied, and having a respective second input connection for receiving the carry-out bit, as delayed by a respective latch cell, from the $(2M-1)^{th}$ adder cell in any other multiplier chunk having its fourth side adjoining the second side of said multiplier chunk being specifically described in this recitation;

a plurality of two-input OR gates having respective output connections for supplying the respective second summand bits for each of said Booth decoder/adder cells located in said zeroeth row, having respective first input connections to which said second control signal bit is applied, and having respective second input connections for receiving a second of the sum and carry-out bits, as delayed by a respective latch cell, from respective ones of further adder cells in any other multiplier chunk having its fourth side adjoining the second side of said multiplier chunk being specifically described in this recitation;

a plurality of two-input OR gates having respective output connections for supplying the respective second summand bits for each of said $(N-1)^{th}$ Booth decoder/adder cells located in rows other than said zeroeth row, having respective first input connections to which said third control signal bit is applied, and having respective second input connections for receiving sum bits from first Booth decoder/adder cells located in any other multiplier chunk having its first side adjoining the third side of said multiplier chunk being specifically described in this recitation and more specifically located in its rows identified by ordinal numbers one lower than the rows in which said $(N-1)^{th}$ Booth decoder/adder cells supplied respective second summand bits are located; and an OR gate having a respective output connection for supplying the second summand bit for said $(N-1)^{th}$ further adder cell in said row of further adder cells, having a respective first input connection to which said third control signal bit is applied, and having a respective second input connection for receiving the sum bit from the first Booth decoder/adder cell in the $2(M-1)^{th}$ row of any other multiplier chunk having its third side adjoining the first side of said multiplier chunk being specifically described in this recitation.

15. A digital multiplier constructed along the surface of a monolithic integrated circuit, said digital multiplier for multiplying N-bit multiplicands by 2M-bit multipliers, M and N being respective positive integers that may be the same or may differ from each other, M*N being the product of the integers M and N the bits of said multiplicand being identified by respective ones of the consecutive ordinal numbers zeroeth through $(N-1)^{th}$ assigned in order of ascending significance, said digital mutiplier comprising:

means for appending a bit as least significant bit to said 2M-bit multiplier to form an extended multiplier;

a plurality M in number of Booth encoder cells arranged in a column extending in a first direction along the surface of said monolithic integrated circuit die, each Booth encoder cell responding to three bits of said extended multiplier to generate respective C0 and C1 and C2 code bits, said Booth encoder cells being identified by respective ones of the consecutive even ordinal numbers zeroeth through $2(M-1)^{th}$, each said Booth encoder cell identified by a higher ordinal number encoding bits of said extended multiplier of signifiance equal to or greater than the bits encoded by said encoder identified by next lower ordinal number;

respective zeroeth and first and second Booth-code lines extending from each said Booth encoder cell in a second direction along the surface of said monolithic integrated circuit die perpendicular to said first direction, for applying the C0 and C1 and C2 code bits from that said Booth encoder cell;

M*N Booth decoder/adder cells, a respective row of N said Booth decoder/adder cells associated with each said Booth encoder cell being identified by the same ordinal number as said Booth encoder cell with which it is associated, being located along said zeroeth and first and second Booth-code lines extending from said Booth encoder cell with which it is associated, and connecting from said zeroeth and first and second Booth-code lines, the N said Booth decoder/adder cells in each row being identified by respective ones of the consecutive ordinal numbers zeroeth through $(N-1)^{th}$ assigned in order of the serial locations of each of said Booth decoder/adder cells within a said row, each Booth decoder/adder circuit receiving as an input signal thereto the bit of said multiplicand identified by a corresponding ordinal number as supplied thereto from a respective multiplicand bit bus extending in said first direction, each Booth decoder/adder cell capable of receiving first and second summand bits and a carry-in bit, each Booth decoder/adder cell capable of generating a sum bit, a first carry-out bit of twice the significance of its sum bit and a second carry-out bit;

a plurality of functional cells connected as a carry-select final adder for combining the first carry-out and sum bits of said zeroeth Booth decoder/adder cells in each of said zeroeth through $2(M-2)^{th}$ rows, the sum bits of said first Booth decoder/adder cells in each of said zeroeth through $2(M-2)^{th}$ rows, the complement of the C0 signal generated by each Booth encoder cell, and the sum and first carry out bits of said zeroeth through $(N-1)^{th}$ Booth decoder/adder cells in said $2(M-1)^{th}$ row; and electrical connections of said cells for completing said digital multiplier.

16. A digital multiplier as set forth in claim 15 wherein said plurality of functional cells connected as a carry-select final adder comprises:

a plurality 4M in number of adder cells arranged in zeroeth and first columns each paralleling said column of M Booth encoder cells, said adder cells identified within each of their said zeroeth and first columns by consecutive ordinal numbers zeroeth through $(2M-1)^{th}$, each adder cell capable of receiving first and second summand bits and a carry-in bit, each adder cell capable of generating a sum bit and a carry-out bit of twice the significance of its sum bit;

a plurality 2M in number of sum-bit multiplexer cells arranged in a column paralleling said zeroeth and first columns of adder cells, said sum-bit multiplexer cells identified within each of their said first and second columns by consecutive ordinal numbers zeroeth through $(2M-1)^{th}$, each said sum-bit multiplexer cell responding to a control bit supplied thereto to select as a bit of a minor product from said digital multiplier the sum bit generated by the one of said adder cells identified by the same ordinal number as said sum-bit multiplexer located in the column specified by said control bit;

a plurality 2N in number of further adder cells arranged in zeroeth and first rows each parallelling said $2(M-1)^{th}$ row of N said Booth decoder/adder cells, said further adder cells identified within each of their said zeroeth and first rows by consecutive ordinal numbers $2M^{th}$ through $(2M+N-1)^{th}$, each further adder cell capable of receiving first and second summand bits and a carry-in bit, each further adder cell capable of generating a sum bit and a carry-out bit of twice the significance of its sum bit;

a plurality N in number of further sum-bit multiplexer cells arranged in a row parallelling said zeroeth and first rows of further adder cells, each said further sum-bit multiplexer cell responding to a control bit supplied thereto to select as a bit of a major product from said digital multiplier the sum bit generated by the one of said further adder cells identified by the same ordinal number as said sum-bit multiplexer located in the row specified by said control bit;

means connecting groups of successively ordinally numbered ones of the zeroeth through $(2M+N-1)^{th}$ adder cells in said zeroeth column and said zeroeth row into respective subchains, applying the carry-out bit of each adder cell except the last in each subchain as the carry-in bit of the next adder cell in the subchain, said subchains identified by consecutive ordinal numbers beginning with zeroeth assigned based on the progression of ordinal numbers identifying adder cells therein;

means connecting corresponding groups of successively ordinally numbered ones of the zeroeth through $(2M+N-1)^{th}$ adder cells in said first column and said first row into respective subchains, applying the carry-out bit of each adder cell except the last in each subchain as the carry-in bit of the next adder cell in the subchain, said subchains identified by consecutive ordinal numbers beginning with zeroeth assigned based on the progression of ordinal numbers identifying adder cells therein;

means for applying a ZERO as carry-in bit to the initial adder cell in each subchain of adder cells within said zeroeth column and said zeroeth row;

means for applying a ONE as carry-in bit to the initial adder cell in each subchain of adder cells within said first column and said first row;

a respective carry-bit multiplexer for each pair of subchains, each carry-bit multiplexer identified by an ordinal number corresponding to those by which subchains in said pair are identified, each carry-bit multiplexer responding to a control bit supplied thereto to select as a carry-out bit the carry-out bit generated by the last of said adder cells in said respective pair of subchains identified by the same ordinal number as said carry-bit multiplexer and located in the row or column specified by said control bit;

means for supplying a carry-in bit to said digital multiplier for application as the control bit of the sum-bit multiplexers selecting bits from said zeroeth subchains and as the control bit of the zeroeth carry-bit multiplexer;

means for applying the carry-out bit of each carry-bit multiplexer except the last, as the control bit of the carry-bit multiplexer identified by an ordinal number next higher than that by which that carry-bit multiplexer is identified, and as the control bit of the sum-bit multiplexers selecting bits from said subchains identified by an ordinal number next higher than that by which that carry-bit multiplexer is identified; and means for supplying the carry-out bit of said last carry-bit multiplexer as a carry-out bit from said digital multiplier.

17. A digital multiplier as set forth in claim 16 wherein said electrical connections of said cells for completing said digital multiplier comprise:

electrical connections within each said row for applying the second carry-out bit of each of said zeroeth through $(N-2)^{th}$ Booth decoder/adder cells as the carry-in bit of the Booth decoder/adder cell with next higher ordinal number;

a respective electrical connection for applying the first carry-out bit of each of said first through $(N-1)^{th}$ Booth decoder/adder cells in each said row except said $2(M-1)^{th}$ row, as the first summand bit of said Booth decoder/adder cell that is identified by ordinal number next lower than the ordinal number of the Booth decoder/adder cell supplying its first carry-out bit thereto and that is located in said row identified by the ordinal number two higher than the row of the Booth decoder/adder cell supplying its first carry-out bit thereto;

a respective electrical connection for applying the respective sum bit of each of said second through $(N-1)^{th}$ Booth decoder/adder cells in each said row except said $2(M-1)^{th}$ row, as the second summand bit to said Booth decoder/adder cell that is identified by ordinal number two lower than the ordinal number of the Booth decoder/adder cell supplying its sum bit thereto and that is located in said row identified by the ordinal number two higher than the row of the Booth decoder/adder cell supplying its sum bit thereto;

respective electrical connections for applying the sum bit of said zeroeth Booth decoder/adder cell in each said row, as the second summand bits of said adder cells in said zeroeth and first columns of adder cells that are identified by the same ordinal number as that identifying the row in which said zeroeth Booth decoder/adder cell is located;

respective electrical connections for applying the first carry-out bit of said zeroeth Booth decoder/adder cell in each said row, as the first summand bits of said adder cells in said zeroeth and first columns of adder cells that are identified by the ordinal number one higher than that identifying the row in which said zeroeth Booth decoder/adder cell is located;

respective electrical connections for applying the respective sum bit of said first Booth decoder/adder cell in each said row, as the second summand bits of said adder cells in said zeroeth and first columns of adder cells that are identified by the ordinal number one higher than that identifying the row in which said first Booth decoder/adder cell is located; and means for applying the complement of the respective C0 code bit generated by each of said zeroeth through $2(M-1)^{th}$ Booth encoder cells as the first summand bits of the adder cells in said zeroeth and first columns of adder cells that are identified by ordinal number equal to that of the Booth encoder cell generating that C0 code bit;

18. A digital multiplier as set forth in claim 17 wherein said electrical connections of said cells for completing said digital multiplier further comprise:

respective electrical connections for applying the first carry-out bit of each of said first through $(N-1)^{th}$ Booth decoder/adder cells in said $2(M-1)^{th}$ row, as the first summand bits of said further adder cells in said zeroeth and first rows of further adder cells that are identified by the ordinal number higher by $(2M-1)$ than said Booth decoder/adder cell supplying its first carry-out bit thereto;

respective electrical connections for applying the respective sum bit of each of said second through $(N-1)^{th}$ Booth decoder/adder cells in said $2(M-1)^{th}$ row, as the second summand bits of said further adder cells in said zeroeth and first rows of further adder cells that are identified by the ordinal number $2(M-1)$ higher than said Booth decoder/adder cell supplying its sum bit thereto;

a respective electrical connection for applying the second carry-out bit of said $(N-1)^{th}$ Booth decoder/adder cell in each said row except said $2(M-1)^{th}$ row, as the second summand bit of said $(N-2)^{th}$ Booth decoder/adder cell in said row identified by the ordinal number two higher; and electrical connections for applying the second carry-out bit of said $(N-1)^{th}$ Booth decoder/adder cell in said $2(M-1)^{th}$ row, as the second summand bits of said $(2M+N-2)^{th}$ adder cells in said zeroeth and first rows of further adder cells.

19. A digital multiplier as set forth in claim 18 combined with: means for applying to each of said Booth decoder/adder cells in said zeroeth row a ZERO as a first summand bit; and means for applying a ONE as the the control bit of the zeroeth carry-bit multiplexer.

20. A digital multiplier as set forth in claim 19 combined with: means for applying to each of said Booth decoder/adder cells in said zeroeth row a ONE as a second summand bit.

* * * * *